United States Patent
Chung et al.

(10) Patent No.: US 12,397,199 B1
(45) Date of Patent: Aug. 26, 2025

(54) PLAYER MODELING USING CAPTURED MULTIMEDIA DATA

(71) Applicant: Scout Smarter AI, INC., Spring Hill, TN (US)

(72) Inventors: Fred Fai Chung, Spring Hill, TN (US); Thomas Christopher Pettit, II, Spring Hill, TN (US); Kyle Green O'Brien, Spring Hill, TN (US); Joseph Nejman, Spring Hill, TN (US); Sean Smith, Spring Hill, TN (US); Xizewen Han, Spring Hill, TN (US)

(73) Assignee: SCOUT SMARTER AI, INC., Spring Hill, TN (US)

( * ) Notice: Subject to any disclaimer, the term of this patent is extended or adjusted under 35 U.S.C. 154(b) by 0 days.

(21) Appl. No.: 19/036,985

(22) Filed: Jan. 24, 2025

(51) Int. Cl.
  *A63B 24/00* (2006.01)
  *G06V 20/40* (2022.01)
(52) U.S. Cl.
  CPC .......... *A63B 24/0062* (2013.01); *G06V 20/42* (2022.01)
(58) Field of Classification Search
  CPC ............................ A63B 24/0062; G06V 20/42
  See application file for complete search history.

(56) References Cited

U.S. PATENT DOCUMENTS

| | | | |
|---|---|---|---|
| 2011/0013836 A1* | 1/2011 | Gefen | G06T 7/248 382/171 |
| 2016/0166935 A1* | 6/2016 | Condrey | A63F 13/48 463/31 |
| 2017/0095716 A1* | 4/2017 | Lewis | A63B 69/40 |
| 2018/0054659 A1* | 2/2018 | Goswami | H04N 13/243 |

* cited by examiner

*Primary Examiner* — Reginald A Renwick
(74) *Attorney, Agent, or Firm* — Foley & Lardner LLP

(57) ABSTRACT

Systems and methods for player modeling using captured multimedia data. A system can include one or more processors to receive, via an interface, digital content including at least one captured media segment corresponding with at least one player. The one or more processors can apply the digital content as input to at least one artificial intelligence (AI) model to generate a player profile including a sport-specific textual representation of the player corresponding to a plurality of performance parameters, and the AI model can be configured based at least on sport vernacular and historical labeled digital content of a sport of the player. The one or more processors can generate a structured data package including the player profile based on organizing at least a portion of the sport-specific textual representation and provide the structured data package to a digital application or a scouting computing system.

29 Claims, 7 Drawing Sheets

PLAYER MODELING USING CAPTURED MULTIMEDIA DATA

BACKGROUND

The present disclosure relates generally to modeling data, and more particularly to performance modeling using artificial intelligence (AI).

SUMMARY

Some implementations relate to a system including one or more processors. The one or more processors can receive, via an interface, digital content including at least one captured media segment corresponding with at least one player. The one or more processors can apply the digital content and a sport-specific dataset as input to at least one artificial intelligence (AI) model to cause the at least one AI model to generate a player profile including a sport-specific textual representation of the least one player corresponding to a plurality of performance parameters, the at least one AI model configured based at least on sport vernacular and historical labeled digital content of a sport of the at least one player. In some implementations, generating the player profile includes modeling, using the at least one AI model, the digital content and the sport-specific dataset to generate the plurality of performance parameters including at least one metric or at least one indicator corresponding to a predicted future performance of the at least one player. The one or more processors can generate a structured data package including the player profile based at least on organizing, using at least one sport-specific template, at least a portion of the sport-specific textual representation. The one or more processors can provide the structured data package to a digital application or a scouting computing system.

In some implementations, generating the player profile includes simulating, using the at least one AI model, the at least one player based at least on the digital content to generate at least one capability corresponding to a position parameter or performance attribute, and physical performance data is further applied as input to the at least one AI model to generate the player profile, wherein the physical performance data includes at least one (i) sensor metric corresponding with position tracking or biometric output or (ii) game metric corresponding with an in-game performance.

In some implementations, generating the player profile includes at least one of modeling, using the digital content and a sport-specific role dataset, at plurality of role scenarios of the at least one player to generate the plurality of performance parameters including a plurality of role-based performance metrics corresponding to at least one update in the player profile based on a plurality of roles according to the sport-specific role dataset, modeling, using the digital content and at least one roster dataset, chemistry of the at one player with at least one roster of the at least one roster dataset to generate at least one of the plurality of performance parameters including a chemistry indicator corresponding to simulated interactions with the at least one roster, or modeling a plurality of event scenarios corresponding to environmental conditions or event conditions to generate at least one of the plurality of performance parameters including a performance metric of the at least one player under each of the plurality of event scenarios.

In some implementations, generating the player profile includes at least one of modeling, in real-time, the digital content corresponding to a real-time analysis captured in the at least one captured media segment to generate the sport-specific textual representation, modeling, using the digital content and an event log dataset, a player interaction corresponding to recorded event tracking actions between the at least one player and one or more other players to generate the plurality of performance parameters including a plurality of interaction metrics corresponding to interaction effectiveness, or modeling, using the digital content and a sport-specific role dataset, an in-game interaction corresponding to positional updates of the at least one player to generate at least one of the plurality of performance parameters including a role adaptation metric.

Some implementations relate to a system including one or more processors. The one or more processors can receive, via an interface, digital content including at least one captured media segment corresponding with at least one player. The one or more processors can apply the digital content as input to at least one artificial intelligence (AI) model to cause the at least one AI model to generate a player profile including a sport-specific textual representation of the least one player corresponding to a plurality of performance parameters, the at least one AI model configured based at least on sport vernacular and historical labeled digital content of a sport of the at least one player. The one or more processors can generate a structured data package including the player profile based at least on organizing, using at least one sport-specific template, at least a portion of the sport-specific textual representation. The one or more processors can provide the structured data package to a digital application or a scouting computing system.

In some implementations, generating the player profile includes simulating, using the at least one AI model, the at least one player based at least on the digital content to generate at least one capability corresponding to a position parameter or performance attribute, wherein physical performance data is further applied as input to the at least one AI model to generate the player profile, wherein the physical performance data includes at least one (i) sensor metric corresponding with position tracking or biometric output or (ii) game metric corresponding with an in-game performance.

In some implementations, generating the player profile includes at least one of modeling, using the digital content and a sport-specific role dataset, at plurality of role scenarios of the at least one player to generate the plurality of performance parameters including a plurality of role-based performance metrics corresponding to at least one update in the player profile based on a plurality of roles according to the sport-specific role dataset, modeling, using the digital content and at least one roster dataset, chemistry of the at one player with at least one roster of the at least one roster dataset to generate at least one of the plurality of performance parameters including a chemistry indicator corresponding to simulated interactions with the at least one roster, or modeling a plurality of event scenarios corresponding to environmental conditions or event conditions to generate at least one of the plurality of performance parameters including a performance metric of the at least one player under each of the plurality of event scenarios.

In some implementations, generating the player profile includes at least one of modeling, in real-time, the digital content corresponding to a real-time analysis captured in the at least one captured media segment to generate the sport-specific textual representation, modeling, using the digital content and an event log dataset, a player interaction corresponding to recorded event tracking actions between the at least one player and one or more other players to generate the plurality of performance parameters including a plurality of interaction metrics corresponding to interaction effectiveness, or modeling, using the digital content and a sport-specific role dataset, an in-game interaction corresponding to positional updates of the at least one player to generate at least one of the plurality of performance parameters including a role adaptation metric.

In some implementations, the one or more processors can activate a live scouting mode in the digital application, wherein activating the live scouting mode includes continuously capturing the digital content and applying the digital content as input to the at least one AI model to generate or update the sport-specific textual representation in real-time.

In some implementations, the one or more processors can generate at least one trip schedule based on determining a travel path, event timing conflicts, and scout availability of a scout.

In some implementations, the one or more processors can generate or update the digital content based on extracting at least one unstructured player metric of the at least one player from the at least one captured media segment.

In some implementations, generating the player profile includes correlating at least one quantitative player performance metric from processed digital content with descriptive data from at least one observation in the processed digital content to generate at least one alignment metric, determining at least one evaluation score representing a weighted combination of the at least one quantitative player performance metric and at least one scout-assigned grade of the at least one player, and generating at least one predictive metric for a future player performance based on historical game data and the digital content corresponding with an identified trend in the at least one captured media segment.

In some implementations, the one or more processors can normalize a plurality of player grades of a plurality of player profiles by applying a calibration function aligning the plurality of player grades of a plurality of scouts and a plurality of players.

In some implementations, the one or more processors can, in response to receiving the digital content, identify environmental data corresponding with the at least one captured media segment, wherein the environmental data is further applied as input to the at least one AI model to cause the at least one AI model to generate the player profile.

In some implementations, generating the structured data package includes integrating, from one or more data sources, third-party data into the structured data package corresponding with the player profile.

In some implementations, the one or more processors can transmit, to the digital application, at least one partially captured media segment, update the digital application with the structured data package responsive to generating the structured data package, provide, in the digital application, a text editing interface to update a portion of the structured data package, and, responsive to receiving an interaction with the text editing interface, update the portion of the structured data package and update the player profile.

In some implementations, the one or more processors can continue capturing the at least one captured media segment responsive to a navigation closing the digital application or a display of a user device deactivating.

In some implementations, the sport-specific textual representation includes a plurality of player-specific performance metrics and corresponding environmental or interaction data, wherein the plurality of performance parameters include one or more metrics or indicators corresponding with capabilities, tendencies, or achievements of the at least one player, and wherein training the at least one AI model includes updating one or more modeling parameters used by the at least one AI model in generating one or more subsequent outputs based on the sport vernacular and historical labeled digital content.

In some implementations, the at least one sport-specific template corresponds to a predefined schema identifying at least one configuration or state of the digital application, and wherein the organizing the portion of the sport-specific textual representation includes mapping the portion to one or more fields of the structured data package based on the predefined schema.

Some implementations relate to a method. The method can include receiving, by one or more processors via an interface, digital content including at least one captured media segment corresponding with at least one player. The method can include applying, by the one or more or more processors, the digital content as input to at least one artificial intelligence (AI) model to cause the at least one AI model to generate a player profile including a sport-specific textual representation of the least one player corresponding to a plurality of performance parameters, the at least one AI model configured based at least on sport vernacular and historical labeled digital content of a sport of the at least one player. The method can include generating, by the one or more processors, a structured data package including the player profile based at least on organizing, using at least one sport-specific template, at least a portion of the sport-specific textual representation. The method can include providing, by the one or more processors, the structured data package to a digital application or a scouting computing system.

BRIEF DESCRIPTION OF THE DRAWINGS

Various objects, aspects, features, and/or advantages of the disclosure will become more apparent and better understood by referring to the detailed description taken in conjunction with the accompanying drawings, in which like reference characters identify corresponding elements throughout. In the drawings, like reference numbers indicate identical, functionally similar, and/or structurally similar elements.

Figure 1:
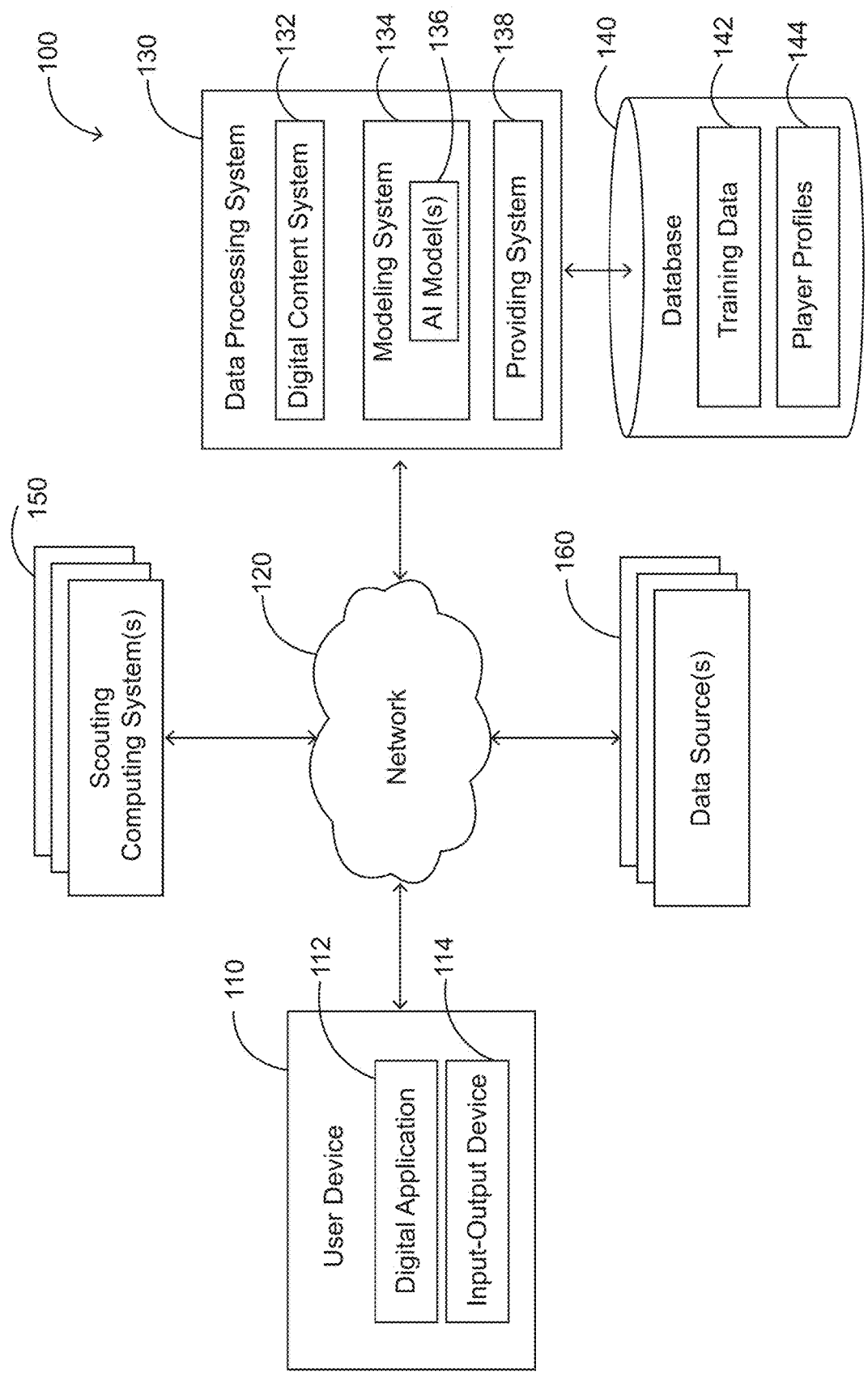
FIG. 1 depicts a block diagram of an example system for player modeling using captured multimedia data, in accordance with some implementations of the present disclosure.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Ingesting diverse digital content and improving the accuracy of artificial intelligence (AI) models for sports scouting and player evaluation presents challenges. Traditional methods rely on static datasets and predefined processing frameworks that limit adaptability to domain-specific requirements. These methods often require extensive manual input from scouts and/or coaches, such as annotated observations or game performance data, which can result in inefficiencies and reduced scalability. Current systems are inadequate in leveraging real-time or near real-time inputs and domain-specific vernacular to generate player profiles. Additionally, existing AI models used for scouting often fail to integrate heterogeneous datasets, such as video, audio, and metadata, into structured outputs that reflect actionable insights. Challenges in dynamic data ingestion and AI model adaptability create inefficiencies in scouting workflows, affecting the quality and speed of player evaluations for applications such as professional sports recruitment, player development, and/or game strategy planning.

Implementations of the present disclosure relate to systems and methods for ingesting and processing digital content to improve the performance of AI models in generating structured player profiles and domain-specific outputs. Systems and methods are disclosed that can ingest and process diverse digital content, such as video footage, audio recordings, and scouting metadata, to train and update AI models. For example, systems and methods in accordance with the present disclosure can integrate domain-specific vernacular and historical labeled datasets to enhance the accuracy of AI models in generating sport-specific textual representations. Additionally, the disclosed systems and methods can create virtual representations of players (e.g., digital twins) and simulate player interactions to generate predictive metrics and performance evaluations. By leveraging real-time data ingestion and AI model adaptability, the disclosed systems and methods improve the efficiency and accuracy of player profiling and scouting workflows. These implementations provide technical improvements by facilitating dynamic data processing and enhancing the precision of AI models, providing more informed decision-making in sports scouting and evaluation.

This disclosure relates to systems and methods for ingesting diverse digital content and improving AI models to generate sport-specific textual representations and structured player profiles. Some systems can dynamically ingest digital content, such as video, audio, and metadata, captured during scouting activities and process the content to generate structured outputs. For example, systems in accordance with the present disclosure can ingest and preprocess raw media content (e.g., game footage and/or audio commentary) to extract features relevant to player evaluation, such as positional metrics, biomechanical motion data, and/or scout-provided observations.

Some techniques for player evaluation rely on manual annotation or static datasets, which can introduce inefficiencies and limit adaptability. These techniques often fail to provide comprehensive insights due to their inability to integrate diverse datasets and adapt to domain-specific requirements. The limitations relate to how these systems handle dynamic content ingestion, model training, and domain-specific output generation. For example, traditional AI models can lack the ability to incorporate sport-specific vernacular or adapt to real-time scouting data, leading to incomplete or inaccurate player profiles.

Systems and methods in accordance with the present disclosure can improve player profiling and scouting workflows by leveraging AI models trained on sport-specific datasets. For example, the systems can utilize large language models (LLMs) and neural networks trained on historical labeled datasets and real-time inputs to generate player profiles that include textual and numerical data corresponding to performance metrics, positional attributes, and/or predicted capabilities. For example, the system can process digital content to extract key performance indicators (KPIs), such as sprint speed, shooting accuracy, and reaction efficiency, and integrate these indicators into a structured player profile.

Additionally, the disclosed systems and methods can generate virtual representations of players, such as digital twins, to simulate player interactions and assess performance under various scenarios. For example, the system can simulate how a player can perform in different roles or environmental conditions (e.g., varying weather, opponent strategies) by integrating domain-specific modeling parameters. These simulations can provide predictive insights, such as expected contributions in future games or potential areas for skill development.

The disclosed systems and methods can further enhance AI model performance by implementing training and updating processes based on dynamic data ingestion. For example, the system can ingest real-time or near real-time data from scouting applications, preprocess the data to normalize and format inputs, and use the processed data to update model parameters (e.g., weights, biases). This process can improve the accuracy and adaptability of the AI models, allowing the AI models to generate more precise and relevant outputs for player evaluation.

In some implementations, the system can utilize graphical user interfaces (GUIs) to present scouting data and player profiles to users, such as scouts, coaches, and/or any other team staff, player personnel, management personnel, analysts, and/or stakeholders involved in player evaluation or decision-making processes. For example, the GUIs can display structured data packages that include performance metrics, positional attributes, and/or predictive analytics, allowing users (e.g., scouts and/or coaches) to interact with and refine the outputs. Additionally, the GUIs can support filtering and search functionalities to facilitate efficient navigation and analysis of scouting data.

The systems and methods described herein can be used for various applications, including professional sports scouting, player development, team strategy planning, and performance tracking. By improving the ingestion and processing of digital content and enhancing the accuracy of AI models, the disclosed systems and methods provide technical improvements that provide more efficient and accurate player evaluations in dynamic and competitive environments.

Referring now to FIG. 1, a block diagram illustrating an example system 100 for player modeling using captured multimedia data using artificial intelligence and a digital application is shown, according to some implementations. As illustrated by way of example in FIG. 1, an example system 100 can include at least a user device 110, a network 120, a data processing system 130, a database 140, scouting computing system(s) 150, and/or data source(s) 160. In some implementations, the user device 110 can include a digital application 112 and an input-output (I/O) device 114. The data processing system 130 can further include a digital content system 132, a modeling system 134, and/or a providing system 138, and/or the modeling system 134 can include artificial intelligence (AI) model(s) 136. In some implementations, the data processing system 130 can include or, as shown, be communicatively coupled or linked to the database 140. The database 140 can include training data 142 and player profiles 144. Although the various computing elements of FIG. 1 can be described in the singular form below (e.g., user device 110, scouting computing system 150), it should be understood that the example system 100 can include any number (e.g., zero, one, two or more) of any device/system described herein.

In some implementations, the data processing system 130 can be configured or structured to perform various operations for providing an artificial intelligence based scouting platform, as further described herein. For example, the data processing system 130 can perform operations including, but not limited to, receiving, collecting, and/or updating digital content, applying an input to an artificial intelligence (AI) model, generating or updating a player profile, generating or organizing a sports-specific textual representation, modeling or simulating interactions or performance parameters, determining performance parameters, interaction data, and/or environmental data, generating, updating, and/or normalizing player grades, generating a structured data package, generating or determining a travel path or trip schedule, and/or interfacing with one or more digital applications or scouting systems. In some implementations, one or more of the subcomponents or systems of the data processing system 130, such as digital content system 132, modeling system 134, AI model(s) 136, and/or providing system 138, can be configured or structured to perform such operations, as further described herein.

In some implementations, one or more of the user device 110, network 120, data processing system 130, included sub-systems of the data processing system 130 (e.g., digital content system 132, modeling system 134, AI model(s) 136, providing system 138), database 140, scouting computing system(s) 150, and/or data source(s) 160 can include at least one processing system or device, such as a computing device having at least one processing circuit configured to execute instructions stored in a memory device to perform one or more operations described herein. The processing circuit can include a processor, such as a microprocessor, an application-specific integrated circuit (ASIC), a field-programmable gate array (FPGA), and/or combinations thereof. The processing circuit can include a memory, and/or the memory can include, but is not limited to, electronic, optical, magnetic, and/or any other storage or transmission device capable of providing processor(s) with program instructions. The instructions can include code from any suitable computer programming language such as. The memory can be included in the processing circuit and can include, but is not limited to, electronic, optical, magnetic, and/or any other storage devices capable of providing a processor or processing circuit with program instructions.

Figure 5:
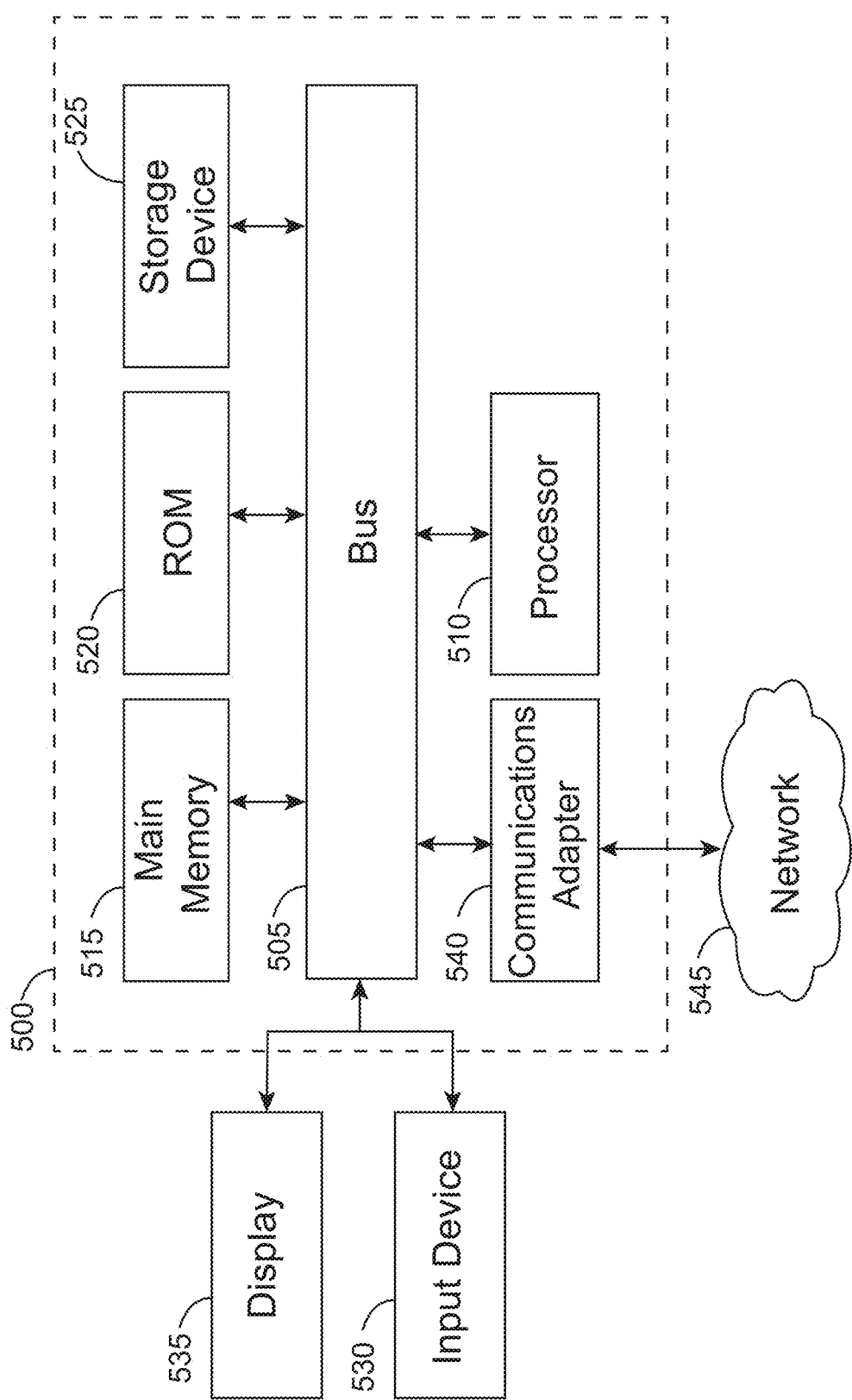
FIG. 5 depicts a block diagram illustrating an example computing system for use in the various implementations described herein.

In some implementations, one or more of the user device 110, network 120, data processing system 130, included sub-systems of the data processing system 130 (e.g., digital content system 132, modeling system 134, AI model(s) 136, providing system 138), database 140, scouting computing system(s) 150, and/or data source(s) can include the structural components of the computing device described in FIG. 5, which can be used to run or otherwise implement the various functionalities and/or features described herein. In other implementations, one or more elements of the example system 100 can include a distributed processing cluster, server, cloud processing system, and/or any other computing device or system. That is, the one or more of the systems of elements of example system 100 can include or execute at least one computer program or at least one script. In some implementations, one or more elements of the example system 100 can include combinations of software and hardware, such as one or more processors configured to execute one or more code packages and/or scripts.

In some implementations, components of the example system 100 (e.g., user device 110, data processing system 130) communicate over network 120. Network 120 can include computer networks such as the Internet, local, wide, metro or other area networks, intranets, satellite networks, other computer networks such as voice or data mobile phone communication networks, combinations thereof, and/or any other type of electronic communications network. Network 120 can include or constitute a display network. In various implementations, network 120 facilitates secure communication between components of example system 100. As a non-limiting example, network 120 can implement transport layer security (TLS), secure sockets layer (SSL), hypertext transfer protocol secure (HTTPS), and/or any other secure communication protocol.

In some implementations, network 120 can be composed of various network devices (nodes) communicatively linked to form one or more data communication paths between participating devices. The network 120 can facilitate communication between the various nodes, such as the user device 110, data processing system 130, database 140, scouting computing system(s) 150, and/or data source(s) 160 (e.g., using an OSI layer-4 transport protocol such as the User Datagram Protocol (UDP), the Transmission Control Protocol (TCP), Stream Control Transmission Protocol (SCTP)). At least one (e.g., each) networked device can include at least one network interface for receiving and/or transmitting data, typically as one or more data packets. An illustrative network 120 can include the Internet; however, other networks can be used. The network 120 can include a type of a broadcast network, a telecommunications network, a data communication network, and/or a computer network.

In some implementations, in addition to processing circuit(s), the data processing system 130 can include and/or be communicatively coupled to one or more databases (e.g., database 140). The databases can be structured as a data repository that can be configured to store various data elements or structures. For example, the database 140 can store training data 142. In some implementations, the training data 142 can include one or more sets of historical labeled digital content (e.g., past game footage, annotated player performance data, historical player evaluations, scouting notes, role-based metrics, and/or any contextual datasets) and/or sport-specific vernacular data (e.g., domain-specific language or terminology corresponding to scouting reports, a sport, and/or a team, player-specific performance descriptions, league-specific jargon, and/or any terminology datasets) that can be used to train the AI model(s) 136. For example, training data 142 can include audit trails of previous changes (e.g., additions, deletions, modifications, revisions, edits, context sentences, source phrases, modified phrases, and/or any updates) outputted by the AI model(s) 136 in generating a player profile (e.g., scouting report, team evaluation, positional breakdown, and/or any role-based insights) and/or sports-specific textual representation (e.g., output, transcription, summary, template-based content, and/or any organized reporting structure).

In some implementations, the database 140 can also store player profiles 144. In some implementations, player profiles 144 can include structured representations of player-specific performance metrics (e.g., skill ratings, statistical summaries, positional capabilities), sport-environmental interaction data (e.g., performance under specific game conditions, role-based adaptability), evaluation data (e.g., sports-specific textual representations, weighted grades, scout-assigned ratings), and/or predictive metrics for future performance (e.g., trend-based projections, potential role fit assessments). For example, the player profiles 144 can include structured or organized scouting reports generated by the AI model(s) 136.

In some implementations, the database 140, can include data structures for storing information such as, but not limited to, digital content (e.g., sound, images, frames, videos, text, annotations, scouting insights, and/or any media data), captured media segments (e.g., recorded audio from a scout, raw or pre-processed video data or audio recordings, clips from training sessions, player interview recordings, and/or any observational content), game and event logs (e.g., event tracking actions, positional updates, and/or player interactions), external data (e.g., API or endpoint addresses, external scouting reports, compliance certifications, external training datasets, third-party performance metrics, league-provided data, and/or any external analytics), templates and schemas (e.g., predefined or sport-specific templates for organizing textual representations or mapping data to structured outputs, player-specific or league-specific templates or presets, evaluation rubrics, roster configurations, and/or any organizational formats), sensor data (e.g., operational data and/or metrics corresponding to position tracking, biometric outputs, geolocation data, movement tracking, fatigue indicators, and/or any sensor-driven outputs), cryptographic data (e.g., cryptographic hashes, encrypted data, public-private key pairs, digital signatures, authentication tokens, and/or any security-related data), operational metadata (e.g., timestamps, environmental indicators, calibration parameters, data mapping configurations, usage statistics, log identifiers, and/or any metadata elements), simulation data (e.g., digital twins representing player performance under simulated game scenarios or positional role simulations, strategy evaluations, performance forecasts, and/or any simulation-driven insights), evaluation and alignment metrics (e.g., scores derived from scout-assigned grades, quantitative performance metrics, chemistry indicators, positional accuracy ratings, trend analysis outputs, and/or any alignment scores) and/or other data (e.g., scheduling data for event planning or trip coordination, normalized player grades or alignment scores, bibliographic information (e.g., for scouts and/or coaches, players), session data corresponding with evaluation sessions, aggregated scout and/or coach feedback logs, calibration parameters, environmental data (e.g., game conditions or player performance variability), comparative performance metrics (e.g., for cross-player or cross-team analyses), player-specific growth trajectories or projections, live scouting data, digital application data (e.g., settings, configurations, structures, selections, user preferences, profile settings, and/or any application metadata), training data (e.g., audit trails of past modifications, modeling parameters including weights or bias values, training history logs, hyperparameter configurations, and/or any training-related information), rosters or staff lists, scout-generated annotations or comments, team-level or league-level aggregate statistics for multi-player evaluations, league-specific presets, training schedules, scouting assignments, and/or any evaluation-related parameters).

In some implementations, the database 140 can be part of and/or a component integrated in the data processing system 130, and/or a separate component that the data processing system 130 and/or the user device 110 can access via the network 120. The database 140 can also be distributed throughout the example system 100 (e.g., computing environment). For example, the database 140 can include multiple databases associated with a client device (e.g., user device 110), the data processing system 130, and/or both. In some implementations, the database 140 can include one or more storage mediums. The storage mediums can include, but are not limited to, magnetic storage, optical storage, flash storage, and/or RAM. In some implementations, the user device 110 and/or data processing system 130 can implement or facilitate various application programming interfaces (APIs) to perform database functions (i.e., managing, synchronizing, and/or linking data stored in database 140). The APIs can include, but are not limited to, SQL, ODBC, JDBC, NOSQL and/or any other data storage and manipulation API.

In some implementations, the database 140 and/or data processing system 130 can implement role-based access controls (e.g., RBACs) including one or more user roles and access levels. For example, the database 140 and/or data processing system 130 can grant or restrict access to specific data within database 140 (e.g., one or more player profiles) based on an assigned user rule (e.g., super admin with full access to all users, teams, and/or data across the platform and for use by management staff, team admin with access to team-specific roster/player data feeds, user data, reports, and/or a regular user with access to a single user account). In some implementations, the database 140 can store device data (e.g., device IDs) associated with user device 110 and/or application data associated with digital application 112 (e.g., user roles, usernames or passwords, access logs, authentication tokens, and/or any permissions metadata).

In some implementations, the user device 110 (sometimes, depending on the configuration of the user device, the user device can be referred to herein as a "user computing system," "electronic device," "mobile device," "mobile electronic device," "scouting device") can be a computing device, personal computer (PC), desktop computer, laptop computer, smartphone, tablet, smart watch, smart sensor, and/or any other device configured to facilitate receiving, displaying, and/or interacting with content (e.g., digital content, scouting reports, interactive dashboards, and/or any media insights) or other data (e.g., player or team data, environmental data, sports-specific datasets, performance parameters, role-specific templates, chemistry indicators, and/or any structured outputs) via an application. For example, user device 110 can be a cell phone configured and/or structured to execute digital application 112 to receive and display content and/or actionable elements. The user device 110 can also include an input/output circuit or device(s) for communicating data over network 120 and/or receiving input data and providing output data.

In some implementations, the user device 110 can include input-output (I/O) device 114. The I/O device 114 can include a microphone and/or other audio input interface configured to capture digital content (e.g., voice recordings, text, videos, player interactions, real-time annotations, and/or any multimedia inputs). In some implementations, the I/O device 114 can be configured and/or structured to facilitate communications (e.g., transmitting or receiving data) between the user device 110 and one or more systems or devices shown in FIG. 1 (e.g., data processing system 130, scouting computing system(s) 150, data source(s) 160, external APIs, and/or any connected networks) and/or other systems or devices. In some implementations, the I/O device 114 can be configured and/or structured to receive and display content and/or actionable elements (e.g., via a graphical user interface of application 112). In some implementations, the I/O device 114 can be configured and/or structured to receive and/or detect user interactions with the content and/or actionable elements presented via the user device 110 and/or digital application 112. In some implementations, the I/O device 114 can include and/or correspond with various interfaces or elements, such as a microphone, a touchscreen display, an alphanumeric keyboard, a screen, and/or a sensor.

In some implementations, the user device 110 can include an application (e.g., digital application 112). In some implementations, the user device 110 can include a plurality of applications. In some implementations, the user device 110 can execute digital application 112 to exchange information between user device 110 and data processing system 130, database 140, scouting computing system(s) 150, and/or data source(s) 160 on behalf of one or more users. For example, the digital application 112 can be configured to retrieve content from other computing systems and devices over the network 120 for display to a user via an interface of user device 110. The digital application 112 can include a mobile application executed by the user device 110. For example, the digital application 112 can include a mobile application, such as a mobile scouting application, which can be downloaded from an app store, pre-installed, and/or hard coded into memory of the user device 110. That is, the mobile scouting application can be implemented to facilitate and/or allow scouts to capture, analyze, and organize player data, including performance metrics, video recordings, and observational notes. For example, the application can integrate data from multiple sources, generate structured reports, and display actionable insights for scouting and evaluation purposes.

In some implementations, the digital application 112 can include a collection of software development tools contained in a package (e.g., software development kit (SDK), application programming interface (API), integrated development environment (IDE), debugger). For example, the digital application 112 can include an application programming interface (API) or a debugger, and/or an SDK that includes an API, a debugger, and/or an IDE. In some implementations, the digital application 112 includes one or more libraries having functions that interface with a particular system software (e.g., iOS, Android, Linux). As a further example, the digital application 112 can include a function configured to collect and report data (e.g., audio recordings, player lookups and/or searches, and/or other multimedia data), and/or a user device 110 can insert the function into the instructions of the digital application 112 to cause the function to be called during one or more actions of the provider institution mobile application (e.g., in response to receiving a selection to record corresponding with a particular player and/or team).

In some implementations, the digital application 112 can present or display one or more interfaces (e.g., graphical user interfaces (GUIs)) via the user device 110. In some implementations, the interfaces can include content items (e.g., text, images, recordings, icons, video previews, performance charts, and/or any interactive widgets for presenting content) and/or actionable elements (e.g., user-selectable or user-interactive features or elements) presented via the digital application 112. For example, the digital application 112 can provide a scouting interface (e.g., for generating, viewing, analyzing, and/or comparing player profiles), a recording interface (e.g., capturing digital content such as audio or video segments or performance data of a player in real-time and/or near real-time), an editing interface (e.g., for editing or adjusting an audio segment or other digital content), a search and/or filtering interface (e.g., for searching, selecting, querying, and/or viewing a subset of results and/or content based on one or more inputs or a filter selection), a scheduling interface (e.g., for organizing travel plans, managing event conflicts, and/or arranging scouting trips), a simulation interface (e.g., for presenting and/or updating digital twin or simulated interactions), a comparison interface (e.g., for side-by-side analysis of multiple player profiles, performance metrics, and/or team compositions), a reporting interface (e.g., for generating and sharing customized reports or summaries based on player data), a content interface (e.g., for viewing and/or interacting with digital content), and/or additional graphical interfaces (e.g., player-specific interfaces, team-specific interfaces, league-specific interfaces, interfaces for managing configurations, accessing training data, and/or monitoring system usage, scouting logs, calibration tools, and/or any analytics dashboards). The various interfaces generated, presented, updated, and/or used by the digital application 112 are described further herein regarding FIG. 3 and FIGS. 4A-4C.

In some implementations, the scouting computing system(s) 150 can include one or more computing systems, devices, services, and/or platforms associated with scouting operations. For example, the scouting computing system(s) 150 can include team-specific API services configured to interact with external platforms or databases to exchange data (e.g., structured scouting data, digital content, game statistics, environmental context, and/or any external metrics), systems for ingesting and processing external datasets (e.g., league statistics, team rosters, historical player performance metrics, training data, simulation results, and/or any scouting reports), additional digital applications (e.g., scouting applications of other scouts or teams), and/or platforms for aggregating, normalizing, and/or synchronizing player grades and metrics. In some implementations, the scouting computing system(s) 150 can process structured data (e.g., player profiles, scouting reports, analytical outputs, team comparisons, trend forecasts, and/or any evaluation summaries) for use by one or more external entities or systems (e.g., digital applications, team databases, league systems, third-party analysis platforms, visualization dashboards, machine learning pipelines, and/or any data integration services).

In some implementations, the scouting computing system(s) 150 can perform operations including standardizing report templates, managing data synchronization between platforms, and/or integrating team- or league-specific data requirements. For example, the scouting computing system(s) 150 can process and/or upload player-specific metrics and/or scouting evaluations to generate structured data packages that adhere to and conform with predefined schemas of external entities (e.g., formatting requirements of another team) and transmit the packages via team-specific API endpoints.

In some implementations, the data source(s) 160 can include various data repositories, services, and/or systems/devices configured to provide data. For example, the data source(s) 160 can include external data repositories, third-party APIs, sport-specific data feeds, public or private databases, social media networks, news feeds, cloud-based platforms, and/or local storage systems. The data source(s) 160 can be configured and/or structured to transmit, via the network 120, external data to one or more of the user device 110, data processing system 130, database 140, and/or scouting computing system(s) 150. In some implementations, the data source(s) 160 can provide external data or information including external digital content, external scouting reports, rosters or team-specific information, performance parameters, historical data (e.g., game footage), player statistics, environmental data (e.g., weather conditions, game venues), and/or sensor outputs (e.g., biometric data, geolocation metrics). In some implementations, the data source(s) 160 can provide third-party data (e.g., social media, news records, recruiting information, injury reports, and/or any performance predictions) for integration into a structured data package corresponding to a player profile.

In some implementations, the AI model(s) 136 can include any machine learning (ML) or AI model that generates content or new content, such as text, images, and/or code, by learning patterns and structures from existing data. For example, the AI model(s) 136 can include a model, a computational system, and/or an algorithm that can learn patterns from data (e.g., chunks of data from various input documents, computer code, templates, forms, event logs, player statistics, and/or any historical datasets) and make predictions or perform tasks without being explicitly programmed to perform such tasks. In some implementations, AI model(s) 136 can refer to or include an ML model that has been trained using machine learning to perform a task, such as classification, regression, and/or clustering. Examples of ML training techniques can include, for example, decision trees, neural networks, and/or support vector machines.

In some implementations, AI model(s) 136 can refer to or include a large language model (LLM), a neural network, and/or any type of artificial intelligence. A large language model (LLM) can include or refer to a neural network-based model with a parameter count (e.g., number of adjustable weights) substantially equivalent to or exceeding one hundred billion parameters and trained on vast and heterogeneous datasets (e.g., collections of text from books, articles, web pages, sports analytics, training manuals, and/or any scouting resources) to perform a range of tasks, including text generation, contextual question answering, and/or language analysis across diverse domains. The AI model(s) 136 can also include or refer to small or medium-sized models (e.g., models with less than one hundred billion parameters and/or trained for delimited tasks) or collections of such models. For example, the AI model 136 can include or refer to a collection or suite of rule-based systems and machine learning models used to perform domain-based tasks including natural language processing, text-to-speech generation, and/or other data modeling operations. In some implementations, the AI model(s) 136 can include one or more text-to-speech models (e.g., models trained to convert textual data into speech outputs based on phrasing, cadence, tone, sport-specific terminology, scouting report conventions, and/or any domain-specific outputs) and one or more generative models (e.g., models trained to create or synthesize textual content such as narratives, summaries, and/or contextual explanations based on provided inputs).

The digital application 112 can be installed and designed to run on smartphones, tablets, and/or other mobile devices. The digital application 112 can include a client-side application that interacts with server-side components over the network. The digital application 112 can be packaged and distributed through app stores. In some implementations, the digital application 112 includes a presentation layer (UI/UX), a logic layer, and/or a data layer. The presentation layer can manage user interactions and display data using graphical user interface components. The logic layer can process user inputs, manage application workflows, and/or enforce rules and policies.

The data layer can manage data storage, retrieval, and/or synchronization with remote servers. The digital application 112 can utilize device capabilities such as cameras, microphones, GPS, accelerometers and/or other sensors, and/or touchscreens. The digital application 112 can operate in online or offline modes, utilizing local storage and caching mechanisms to facilitate functionality when network connectivity is limited. For example, a scout and/or coach can continue recording observations, capturing video clips, or organizing scouting data even in areas with limited or no network access. The digital application 112 can implement one or more security measures, such as encryption, authentication, and/or secure communication protocols, to ensure secure data transmission and storage.

In some implementations, the AI model(s) 136 can include, refer to, and/or otherwise utilize or access a retrieval-augmented generation (RAG) system. For example, the AI model(s) 136 can be designed, constructed or include a transformer architecture with one or more of a self-attention mechanism (e.g., model used to weigh the importance of different words or tokens in a sentence when encoding a word at a particular position), positional encoding, and/or encoder and decoder layers (e.g., multiple layers containing multi-head self-attention mechanisms and feed-forward neural networks). Transformer architecture can include, for example, a generative pre-trained transformer, a bidirectional encoder representations from transformers, transformer-XL (e.g., using recurrence to capture longer-term dependencies beyond a fixed-length context window), text-to-text transfer transformer.

In some implementations, the AI model(s) 136 can be trained using a dataset (e.g., training data 142) of documents (e.g., data sets, web pages or digital content, text, images, videos, audio, domain-specific data, and/or other data) and can be configured to understand and extract relevant information from the dataset. The AI model(s) 136 can be trained (e.g., by a model training function) using any text-based dataset by converting the text data from the input dataset documents into numerical representations (e.g., embeddings) of the chunks of the documents. In some aspects, the AI model(s) 136 can be generated or built using deep learning techniques, such as neural networks. Through training, the AI model(s) 136 can adjust various internal values or modeling parameters, such as relationships between embeddings or numerical values learned during training, to improve performance and/or the accuracy of outputs or predictions.

In some implementations, adjusting modeling parameters can include iteratively presenting embeddings of dataset chunks to the AI model(s) 136, comparing outputs of the AI model(s) 136 to verified or known results, and/or updating parameters (e.g., modifying weight matrices, recalibrating biases, and/or fine-tuning activation thresholds of the AI model(s) 136) based on results of the comparison. By iteratively learning from the dataset embeddings, the AI model(s) 136 can generalize knowledge and generate accurate predictions or relevant insights when processing and/or generating outputs (e.g., player profiles, transcriptions, scouting reports, performance summaries, and/or any structured datasets).

In some implementations, the data processing system 130 can execute and/or otherwise perform various operations, including retrieving, integrating, and/or processing data to facilitate player profiling, scouting analysis, and/or performance predictions. In some implementations, the data processing system 130 can include one or more subcomponents or systems to execute and/or otherwise perform various operations for player profiling, scouting analysis, and/or performance predictions, such as the digital content system 132, modeling system 134, AI model(s) 136, and/or providing system 138. For example, the data processing system 130 and/or digital content system 132 can receive, via an interface, digital content including at least one captured media segment corresponding with at least one player. For example, the digital content can include sound, images, frames, and/or videos, and/or a combination of sound, images, frames, and/or videos captured or recorded using digital application 112 and I/O device 114 of the user device 110 and received by the data processing system 130 and/or digital content system 132 via the network 120.

In some implementations, the captured media segment can include various observations and/or evaluations provided by a scout and/or coach (e.g., a user of digital application 112) regarding a player. That is, the observation can be provided in response to starting and/or otherwise activating a recording corresponding with a player in a digital application and/or device interface. A player can include and/or correspond with any individual, such as an athlete on a high school, college, and/or professional sports roster and/or associated with a team and/or athletic organization. That is, the observations and/or evaluations can include audio data captured using an interface (e.g., graphical interface or GUI of digital application 112, a microphone, I/O device 114, camera, touchscreen, and/or any input device) describing performance parameters (e.g., metrics or indicators of skills, capabilities, tendencies, game statistics, physical fitness levels, and/or any attributes) and/or attributes (e.g., physical data, statistics, positional data, biometric readings, and/or any descriptive indicators) of the player observed during a player interaction (e.g., a sporting event, game, practice, interview, medical evaluation, training session, strategy review, and/or any evaluation activity).

In some implementations, the data processing system 130 and/or modeling system 134 can apply the digital content and a sport-specific dataset as input to at least one artificial intelligence (AI) model. For example, the AI model(s) 136 can be trained on a domain-specific dataset (e.g., using domain-specific phrases or language, team-specific terminology, regional expressions, and/or any domain-relevant text). Further, the data processing system 130 and/or modeling system 134 can provide the digital content to the trained AI model(s) 136, which can process and model the input data to generate a structured or modeled output.

In some implementations, the data processing system 130 and/or modeling system 134 can cause the at least one AI model to generate a player profile including a sport-specific textual representation of the least one player corresponding to a plurality of performance parameters. For example, based on or responsive to receiving the digital content, the AI model(s) 136 can generate a profile or data object including textual and/or numerical information corresponding with an athlete. That is, the AI model(s) 136 can generate an output (e.g., summary reports, structured performance metrics, trend analysis, text-based transcript, scouting insights, and/or any analytical breakdown) of an audio recording captured by a scout and/or coach via the digital application 112. In some implementations, the player profile can include or aggregate performance metrics, player attributes, historical results, scouting indicators, and/or other performance parameters into a structured data object or construct. That is, the data processing system 130, modeling system 134, and/or AI model(s) 136 can process a voice recording as input data and analyze and/or otherwise model one or more performance parameters associated with the input data (e.g., various quantifiable metrics, indicators, and/or features associated with capabilities, tendencies, and/or achievements of an athlete, such as speed, strength, accuracy, consistency, and/or other relevant sports-related attributes, endurance, coordination, and/or any specialized metrics). For example, the data processing system 130, modeling system 134, and/or AI model(s) 136 can perform profile aggregation by integrating and/or modeling data from various input sources (e.g., scouting notes, game footage, sensor-based performance metrics, and/or historical game statistics) to generate a structured and/or consolidated player profile.

In some implementations, the at least one AI model 136 can be configured based at least on sport vernacular and historical labeled digital content (e.g., stored in the training data 142) of a sport of the at least one player. For example, sport vernacular can include and/or correspond with domain-specific terminology and/or linguistic patterns (e.g., slang, position-specific references, league-specific jargon, role-specific phrases, player-specific terms, and/or any sporting nomenclature) associated with a domain (e.g., a sport, a league, a profession, training modules, evaluation standards, and/or any specialized domain). In this example, for football, vernacular can include terms related to offensive and defensive strategies, play formations, or player-specific roles, such as "quarterback vision" or "pass-rushing ability".

In some implementations, historical labeled digital content can include and/or correspond with previously obtained media, transcripts, and/or records annotated with domain categories (e.g., position classifications, skill levels, play outcomes, game strategies, opponent analyses, and/or any historical patterns). For example, the data can be used to fine-tune AI model outputs to match scouting standards or reporting preferences. That is, the AI model(s) 136 can be trained, updated, and/or tuned using domain-specific data to generate accurate and/or refined outputs in a style or format of a corresponding domain. For example, prior to or upon applying the digital content as input to the AI model(s) 136, the data processing system 130, digital content system 132, and/or modeling system 134 can retrieve at least a portion of training data 142 from database 140 and provide the data to the AI model(s) 146, which can process the input data by updating one or more modeling parameters (e.g., nodes, edges, weights, bias terms, gradient thresholds, loss functions, and/or any model parameters) used by the AI model(s) 136 in generating subsequent outputs.

The modeling system 134 can include any one or more artificial intelligence models (e.g., machine learning models, supervised models, neural network models, deep neural network models), rules, heuristics, algorithms, functions, or various combinations thereof to perform operations including processing scout-provided records, such as applying digital content (e.g., including captured media segments), modeling digital content and/or sports-specific datasets, simulating players (e.g., to generate capabilities), and/or modeling role scenarios, modeling chemistry, modeling event scenarios, performing real-time analyses, modeling player interactions, modeling in-game interactions. That is, AI model 136 can be a neural network and/or machine-learning (ML) model trained to convert scout-provided observations into sport-specific textual representations. In some implementations, the modeling system 134 can output player profiles (e.g., metrics, indicators, role-specific descriptions, and/or any structured outputs). For example, the output can be a structured representation of strengths and weaknesses of a player. In another example, the output can be evaluation summaries directly derived from scout-provided notes or recordings. In some implementations, the processed scouting data can be provided to modeling system 134 to perform event-specific simulations.

In some implementations, the modeling system 134 can maintain, execute, train, update, and/or otherwise process, refile, or apply one or more artificial intelligence (AI) models during the processing of scout-provided content stage. In some implementations, the AI model(s) 136 can include any type of domain-specific AI model capable of converting scout and/or coach observations into structured outputs (e.g., profiles describing positional metrics, game-specific performance indicators) to evaluate abilities of a player across various scenarios. For example, the AI model(s) 136 can be trained and/or updated to integrate scout-recorded observations and historical labeled data, among other inputs. The AI model(s) can be or include a transformer-based model (e.g., a generative pre-trained transformer (GPT) model, a bidirectional encoder representations from transformers (BERT)). The machine-learning model(s) can be or include a recurrent neural network (RNN) model, in some implementations. The modeling system 134 can execute the AI model 136 to generate outputs. The modeling system 134 can receive data to provide as input to the AI model(s) 136, which can include scout-provided recordings, game observations, role-specific descriptions, scouting vernacular datasets, and/or any relevant labeled inputs.

In some implementations, the modeling system 134 can execute one or more AI models (e.g., model 136) by utilizing a data-driven optimization framework to improve the performance of the AI model 136. The framework can include implementing techniques such as gradient descent, backpropagation, and distributed training to process scout and/or coach observations and contextual data (e.g., historical labeled digital content, position-specific training datasets). The AI model(s) can incorporate mechanisms such as adaptive learning rates, regularization techniques, and weight pruning to maintain efficiency and prevent overfitting. For example, during execution, the modeling system 134 can partition scout-provided content into mini-batches, apply loss functions, and update model parameters iteratively. The AI models can support inference operations that include processing feature vectors, transforming raw scout and/or coach inputs, and generating sport-specific textual representations and/or metrics. The modeling system 134 can integrate hardware accelerators such as GPUs or TPUs to accelerate inference tasks, for example when handling high volumes of scout-provided recordings.

In some implementations, the modeling system 134 can train and update AI models (e.g., AI model 136, using training data 142) through the preprocessing pipeline that includes scout-recorded preprocessing, feature engineering, and hyperparameter tuning. The preprocessing stage can include normalizing scout-provided datasets, processing missing data, and augmenting inputs for training the AI models 136. Feature engineering can include dimensionality reduction techniques, such as principal component analysis (PCA) or t-SNE. The AI models 136 can incorporate attention mechanisms, customized activation functions, and layered architectures to facilitate learning. In some implementations, the modeling system 134 can evaluate trained models using sport-specific evaluation metrics (e.g., precision, recall, and/or F1 score) and/or any domain-specific scoring criteria, to determine readiness for deployment and/or inference operations.

The AI model 136 can include an input layer, an output layer, and/or one or more intermediate layers, such as hidden layers, which can each have respective nodes. That is, the AI model 136 processes scout-provided recordings, observations, and notes. For example, the input layer receives raw game footage or scouting audio files. For example, the output layer generates player profiles with sport-specific textual representations and associated metrics. For example, the intermediate layers perform feature extraction, embedding generation, and contextual analysis.

In some implementations, the modeling system 134 can configure (e.g., train, update, fine-tune, apply transfer learning to) the AI model 136 by modifying or updating one or more parameters, such as weights and/or biases, of various nodes of the AI model 136 responsive to evaluating estimated outputs of the AI model 136 (e.g., generated in response to receiving training examples in a training dataset, such as a training data 142 including scout-recorded observations, role-based metrics, player attributes, and/or any contextual labels). The modeling system 134 can be or include various neural network models, including models that can for operating on or generating data including but not limited to player performance metrics, game scenario descriptions, role evaluations, and/or various combinations thereof.

In some implementations, the modeling system 134 can be configured (e.g., trained, updated, fine-tuned, has transfer learning performed, etc.) based at least on the training data 142 of the at least one training dataset (e.g., labeled scouting reports, historical player evaluations, event-specific datasets, annotated video content). For example, one or more example scout-provided notes and/or performance observations of the training data can be applied (e.g., by the system 100, or in a pre-training process performed by the system 100 or another system) as input to the AI model 136 to cause the AI model 136 to generate an estimated output. The estimated output can be evaluated and/or compared with labeled scouting data (or predefined annotations) of the training data 142 that correspond with the one or more example observations and/or metrics, and the AI model 136 of the modeling system 134 can be updated based at least on the comparison results and/or error calculations. For example, based at least on an output of a scout-specific observation set, one or more parameters (e.g., weights and/or biases) of AI model 136 of the modeling system 134 can be updated.

In some implementations, to generate the player profile, the data processing system 130 and/or modeling system 134 can model (e.g., apply data as input to the AI model 136 to cause the AI model 136 to perform modeling), using the at least one AI model 136, the digital content and the sport-specific dataset to generate the plurality of performance parameters including at least one metric or at least one indicator corresponding to a predicted future performance of the at least one player. That is, the AI model(s) 136 (e.g., having one or more pre-trained modeling parameters) can receive digital content and process the digital content to generate a player profile including metrics and/or indicators associated with expected outcomes and/or performance predictions for a player being scouted. For example, a metric or indicator corresponding to a predicted future performance can include statistical projections (e.g., expected game performance metrics such as passing accuracy, sprint speed, and/or shooting percentage), positional adaptability (e.g., suitability for specific roles or positions within a team or strategy), and/or chemistry indicators (e.g., compatibility with other players or team formations).

In some implementations, the AI model(s) 136 can simulate various scenarios using the digital content and sport-specific datasets (e.g., training logs, player statistics, game event data, and/or any scouting records) to model player interactions or environmental conditions (e.g., game settings, weather, and/or opponent strength) and generate metrics reflecting performance across various scenarios. For example, the AI model(s) 136 can simulate a performance of a player under high-pressure playoff conditions or when paired with specific teammates.

Additionally, the AI model(s) 136 can integrate historical performance data, scouting observations, and/or environmental parameters to refine predictions and provide context-specific evaluations. That is, the modeling system 134 can apply data corresponding to previous player performances under similar conditions or roles (e.g., performance metrics for players with comparable skills, outcomes in similar game situations, success rates against specific defensive strategies) to generate weighted outputs that align with domain-specific evaluation criteria (e.g., previous outcomes of a player with similar statistics and/or attributes). For example, the model can evaluate how a quarterback with similar passing accuracy performed against specific defensive formations. In another example, the system can predict how an athlete can adapt to adverse weather conditions based on past performances in similar climates.

In some implementations, the data processing system 130, modeling system 134, and/or AI model(s) 136 can generate a structured data package including the player profile. The structured data package can be generated based at least on organizing, using at least one sport-specific template, at least a portion of the sport-specific textual representation. That is, the sport-specific template can be a predefined format tailored to scouting reports for a particular sport, including sections for metrics, qualitative observations, and positional analysis. For example, a basketball-specific template can include categories for shooting percentage, defensive ratings, and player efficiency ratings.

Additionally, the structured data package can incorporate annotations or recommendations for team strategies or player development plans. For example, a structured data package can include and/or correspond with a formatted arrangement of text, metrics, graphs, video highlights, references associated with a player evaluation, and/or any scouting insights. In some implementations, a sport-specific template can include and/or correspond with a predefined schema or layout (e.g., adhering to the conventions, structure, and/or terminology characteristic of scouting or reporting standards for a sport, player, team, league, region, competition level, and/or any reporting standard). That is, the data processing system 130, modeling system 134, and/or AI model(s) 136 can organize or embed data from the sport-specific textual representation into one or more categories or data fields of a template object.

In some implementations, organizing can include the modeling system 134 assigning performance metrics (e.g., speed, strength, and/or adaptability scores), contextual observations (e.g., game-specific conditions or opponent difficulty), and/or qualitative assessments (e.g., scouting notes or future potential indicators) into one or more sections of the structured data package. For example, the data processing system 130 and/or modeling system 134 can utilize templates configured for league-specific or team-specific formats for compatibility with reporting standards and/or workflows of one or more recipients (e.g., scouting computing system(s) 150). In this example, a league-specific template format can be a standardized structure including league-wide metrics such as average player ratings or performance percentile ranks and a team-specific format can be a custom structure tailored to a unique evaluation criteria of a team, such as preferred playing style or specific skill benchmarks.

In some implementations, the data processing system 130 and/or providing system 138 can provide the structured data package to a digital application or a scouting computing system. For example, the data processing system 130 and/or providing system 138 can deliver the structured data package to a scouting application (e.g., digital application 112) executed on a user device 110 to allow scouts, coaches, and/or administrators to review, analyze, and/or modify the player profile. For example, the data processing system 130 and/or providing system 138 can transmit the structured scouting report to one or more scouting computing system(s) 150 (e.g., front ends for scouts and/or coaches) using one or more team-specific APIs. In some implementations, the data processing system 130 and/or providing system 138 can transmit the structured data package for storage in one or more databases (e.g., database 140) or external platforms (e.g., data source(s) 160, league systems, analytics platforms, video analysis tools, training management systems, and/or any cloud storage services).

In some implementations, the structured data package can include organized player-specific performance metrics, contextual observations, historical performance data, predictive analytics, metadata (e.g., tags, timestamps, event identifiers, environmental conditions), and/or additional data (e.g., headers, references to supplementary resources such as annotated videos or scouting notes, position-specific templates, statistical breakdowns, and/or any team or league-specific formatting elements) that is structured and/or formatted in accordance with a predefined schema.

Figure 2:
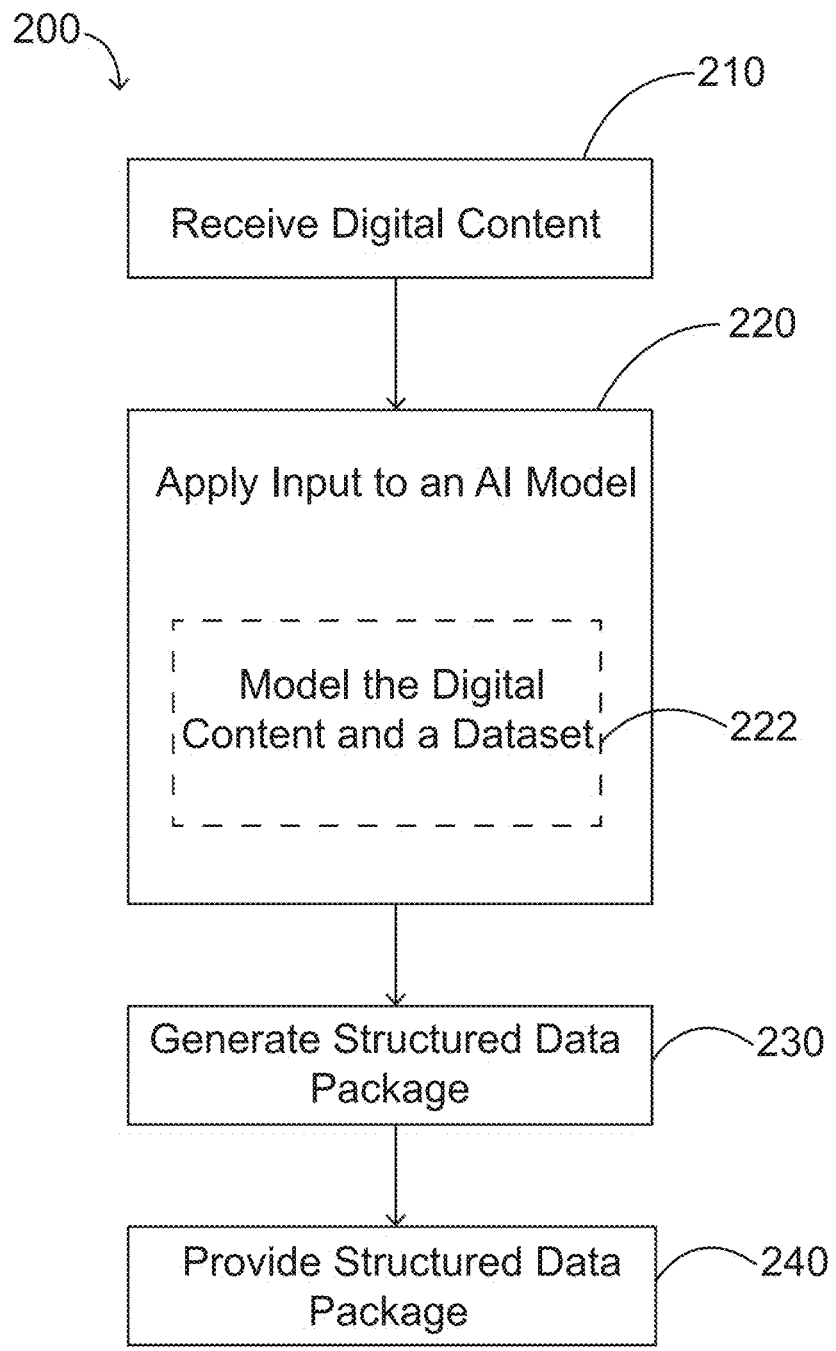
FIG. 2 depicts a flowchart diagram of an example method for player modeling using captured multimedia data, in accordance with some implementations of the present disclosure.

Referring now to FIG. 2, a flowchart diagram of an example method 200 for player modeling using captured multimedia data is shown, according to some implementations. In some implementations, one or more elements of the example system 100 of FIG. 1 (e.g., data processing system 130) and/or one or more processors can perform one or more operations of method 200. In some implementations, additional, fewer, and/or different operations can be performed in method 200 depending on the implementation. In some implementations, some, and/or all operations of method 200 can be performed by one or more processors executing on one or more computing devices, systems, and/or servers. In various implementations, at least one operation can be re-ordered, added, removed, and/or repeated. Additionally, some or all of the operations performed by the blocks can be removed or added.

In broad overview of method 200, at block 210, one or more processors (e.g., data processing system 130) can receive digital content. At block 220, the one or more processors can apply input to an AI model. At block 222, the one or more processors can model the digital content and a dataset. At block 230, the one or more processors can generate a structured data package. At block 240, the one or more processors can provide the structured data package.

In some implementations, the method 200 can relate to and/or facilitate player evaluation, analysis, and/or reporting workflows by processing digital content and generating structured outputs for use across scouting operations, player development programs, team strategy planning, and/or any analytics-driven decision-making systems. For example, method 200 can include receiving digital content or media inputs (e.g., video, audio, and/or observational data) and applying domain-specific processing via artificial intelligence models to generate player profiles based on the inputted data. In some implementations, method 200 can include operations for normalizing data, integrating third-party datasets (e.g., league statistics, external scouting reports, training data, injury records, and/or any external performance datasets), and/or generating structured data packages formatted according to team-specific or league-specific standards. That is, method 200 provides a framework for capturing, processing, and/or distributing player-specific performance metrics, contextual observations, and/or predictive insights to facilitate informed decision-making by scouts, coaches, and/or administrators. In some implementations, the method 200 can further include applying modeling techniques (e.g., simulation modeling, digital twin analysis) to generate scenario-based evaluations of players, predict future performance trends, and/or support role-specific analyses or compatibility assessments across teams or rosters, as further described herein.

At block 210, the one or more processors (e.g., data processing system 130) can receive and/or otherwise obtain digital content. In some implementations, at block 210, the one or more processors can receive, via an interface, digital content including at least one captured media segment corresponding with at least one player. That is, the one or more processors can execute operations to access, decode, and/or parse data streams from user device 110 (e.g., digital application 112, I/O device 114) to extract media inputs such as audio recordings, video segments, and/or textual data. For example, as a scout and/or coach is watching a player or players during a live game or practice session, they can use the digital application to capture audio commentary, record video clips, or annotate observations directly within the application. In this example, the system can associate the captured data with relevant metadata, such as the name of the player, position of the player, and event context. In another example, the one or more processors can process video feeds to identify and segment gameplay sequences and/or analyze audio data to detect verbal observations describing player capabilities. In some implementations, the one or more processors can associate the captured media segment with contextual metadata, such as timestamps, event identifiers, and/or player-specific tags, for subsequent modeling. Additionally, the digital content can include structured or unstructured data reflecting performance observations (e.g., positional tracking metrics, biometric outputs, and/or scout-provided commentary) captured during player interactions or evaluations.

In some implementations, the scout and/or coach can navigate to a player to facilitate recording of the player. That is, responsive to a player being presented in a digital application, the scout and/or coach can select a recording selectable element to begin recording audio corresponding to the performance of the player during a game or practice session. For example, a scout and/or coach can activate a recording interface to capture real-time verbal evaluations of movements, decisions, or skills of a player. In another example, the scout and/or coach can record a video segment highlighting specific gameplay sequences, such as a successful pass, defensive maneuver, or scoring attempt. Additionally, the receiving of the multimedia data can include capturing additional environmental context, such as crowd noise, weather conditions, or opponent interactions, to provide a comprehensive evaluation of the player. That is, a scout and/or coach can use the digital application to tag observations with player-specific details, such as positional roles, skill assessments, and game-specific events. For example, the application can allow scouts to add notes or ratings directly into the recorded data stream for later analysis.

At block 220, the one or more processors can apply input to an AI model. In some implementations, at block 220, the one or more processors can apply the digital content and a sport-specific dataset as input to at least one artificial intelligence (AI) model to cause the at least one AI model to generate a player profile including a sport-specific textual representation. That is, the one or more processors can utilize the sport-specific dataset during a training phase to configure the AI model for generating outputs tailored to a specific sport, and/or the one or more processors can provide the sport-specific dataset as supplementary data used to be AI model (e.g., AI model(s) 136) to update or refine modeled outputs. In some implementations, the sport-specific dataset can include historical labeled data, such as annotated player statistics, archived game footage, and/or domain-specific terminology, which can be provided as input to the AI model during a training phase and used to update modeling parameters (e.g., weights, biases, and/or activation thresholds) used by the AI model in generating the player profile.

In some implementations, the one or more processors can apply the digital content and/or the sport-specific dataset to the trained AI model at runtime (e.g., during inference) to generate a player profile. That is, the digital content (e.g., video footage, audio recordings, and/or scouting notes) can be a first input, and/or the sport-specific dataset can provide supplementary information (e.g., contextual data, historical performance trends, and/or positional benchmarks) that improves accuracy of sport-specific textual representations.

In some implementations, the one or more processors can use the AI model to generate a sport-specific textual representation by performing text-to-speech (TTS) processing on audio content included in the digital content. That is, the one or more processors can execute operations to segment, decode, and/or analyze audio recordings, videos, multimedia content, and/or any real-time audio streams, such as scout and/or coach commentary or in-game verbal observations, using a neural network-based TTS module within the AI model. For example, the one or more processors can extract phonemes, linguistic patterns, and/or contextual keywords from the audio input and apply the sport-specific dataset to interpret domain-specific terminology (e.g., "zone coverage" in football or "fast break" in basketball). In some implementations, the TTS module can align audio features with labeled text data in the sport-specific dataset to generate an output that reflects an intent of the speaker, nuances in speech delivery, contextual emphasis, a domain-specific context, and/or any scouting-specific phrasing.

Additionally, the one or more processors can refine the output by correcting inconsistencies, adding contextual metadata (e.g., timestamps or event markers), and/or organizing the output into structured sentences or phrases that align with predefined templates for scouting reports or player profiles based model relationships or parameters refined using the sport-specific dataset. For example, the output can include descriptors of player performance based on audio-recorded scout and/or coach evaluations and sport-specific language models.

In some implementations, the sport-specific textual representation of the least one player can correspond to a plurality of performance parameters, and/or the at least one AI model can be configured based at least on sport vernacular and historical labeled digital content of a sport of the at least one player. That is, the one or more processors (e.g., data processing system 130) can execute operations to process the digital content and generate a textual representation including and/or corresponding with quantifiable and/or qualitative metrics or indicators associated with performance of an athlete (e.g., capabilities, tendencies, and/or attributes). For example, the one or more processors can analyze the digital content using the AI model to extract metrics or indicators such as physical attributes (e.g., sprint speed, vertical leap, and/or shooting accuracy), positional tendencies (e.g., defensive coverage patterns or offensive spacing effectiveness), and/or interaction data (e.g., pass completion rates or team chemistry indicators). For example, the sport-specific textual representation can include numerical parameters (e.g., sprint speed, shooting accuracy, and/or pass completion rate), descriptive assessments (e.g., agility, decision-making under pressure, and/or defensive anticipation), and/or contextual observations (e.g., performance during high-pressure situations or adaptability to different roles). In some implementations, the output can include evaluative content, such as scout-provided commentary describing player tendencies or strengths (e.g., "good pocket presence" or "effective rebounder") and/or contextual details (e.g., game conditions or opponent characteristics).

In some implementations, the one or more processors can improve the accuracy of the sport-specific textual representation by incorporating historical labeled digital content (e.g., annotated scouting reports, archived gameplay footage) to train or update the AI model with domain-specific sport vernacular. For example, the historical labeled content can include domain-specific terminology or vernacular, contextual descriptions, and/or positional classifications that include tags or other data used by the AI model in generating output and/or refining modeling parameters.

At block 222, the one or more processors can model the digital content and a dataset. In some implementations, generating the player profile at block 220 can include modeling, by the one or more processors using the at least one AI model, the digital content and the sport-specific dataset to generate the plurality of performance parameters including at least one metric or at least one indicator corresponding to a predicted future performance of the at least one player. That is, the one or more processors can analyze the digital content using the AI model to derive domain-specific insights to generate a player profile. For example, domain-specific insights can include role-based adaptability (e.g., suitability for specific positions or roles within a team structure), role-based predictive indicators of future performance (e.g., anticipated statistical improvements, projected growth trends, and/or expected contributions to team success), positional benchmarks, chemistry indicators, training regimen recommendations, game-specific performance metrics, and/or any team strategy evaluations. In another example, the one or more processors can generate metrics evaluating or indicating a capacity of the player to adapt to positional demands (e.g., performance consistency in different roles), scenario-based performance (e.g., effectiveness in high-pressure situations), and/or environmental adaptability (e.g., performance under specific weather conditions or against particular opponents).

In some implementations, the AI model can integrate historical data from the sport-specific dataset with real-time and/or near real-time observations from the digital content to refine modeling outputs (e.g., generating positional benchmarks or predictive metrics based on comparable player archetypes). Additionally, modeling can include the one or more processors simulating various game scenarios or team configurations to estimate a compatibility of a player with team dynamics or strategic roles (e.g., using a digital twin).

Generally, modeling and/or applying an input to an AI model to cause an AI model to generate an output can include feeding preprocessed data (e.g., normalized metrics, textual observations, or multimedia embeddings) into the AI model for inference. That is, the processing circuits can execute operations to parse, encode, and map the input data to a format compatible with the architecture of the AI model. The processing circuits can perform applying an input by chunking large datasets into smaller segments for sequential processing. For example, the processing circuits can convert unstructured player commentary into structured feature vectors representing attributes such as speed, agility, or consistency. Additionally, causing the AI model to generate an output can occur by executing inference routines on domain-specific datasets to align predicted outputs with historical trends or benchmarks. For example, the processing circuits can generate a positional adaptability score by analyzing historical player data in similar roles.

In some implementations, the modeling performed can occur by iteratively refining predictions based on feedback loops comparing real-time observations with expected outcomes. For example, the processing circuits can use reinforcement learning techniques to improve the accuracy of predictive metrics generated by the AI model. That is, the modeling can be performed during the applying and/or causing aspects of implementing the AI models during inference. For example, the processing circuits can integrate real-time game data into modeling pipelines to update predictions based on live performance metrics.

At block 230, the one or more processors can generate a structured data package. In some implementations, at block 230, the one or more processors can generate a structured data package including the player profile based at least on organizing, using at least one sport-specific template, at least a portion of the sport-specific textual representation. That is, the one or more processors can execute operations to map data elements, such as performance metrics, contextual observations, and/or predictive indicators, to predefined fields or categories in a sport-specific template. In some implementations, the structured data package can be compatible with a digital application. That is, it can be integrated into scouting platforms or mobile applications for real-time access and updates. For example, the structured data package can be displayed as a dynamic report that allows users to filter metrics by category or time period.

In some implementations, the sport-specific template can be selected and/or otherwise identified by matching the sport, team, or league associated with the player profile to predefined templates stored in the database. For example, the processing circuits can retrieve a football-specific template when processing data for a quarterback and a basketball-specific template when processing data for a point guard. That is, using the sport-specific template can include the processing circuits mapping collected data to predefined fields, such as offensive and defensive metrics for team sports or individual performance ratings for solo sports. Additionally, a portion of the sport-specific textual representation in that it can be translated into visual summaries, such as charts, heatmaps, or tables, to enhance interpretability. For example, speed metrics can be visualized as trend lines, while shooting accuracy can be displayed as a percentage in a formatted table. In another example, scouting notes can be tagged to specific video highlights for contextual reference.

Additionally, the structured data package can be generated for implementation in a digital application and/or otherwise presentation interface. That is, the structured data package can include data formatted for interactive dashboards, performance comparisons, and predictive analytics views. For example, the structured data package can include player-specific performance metrics (e.g., sprint speed, pass completion rates, and/or shooting accuracy), descriptive assessments (e.g., decision-making capabilities or adaptability to strategic roles), and/or predictive metrics (e.g., projected growth trends or positional effectiveness) that can be structured and/or organized in one or more sections (e.g., template fields) of a template or preset. In this example, the player-specific performance metrics can be formatted and/or otherwise organized such that key metrics are prominently displayed, with additional details available through expandable sections or tooltips. In another example, organizing can include the one or more processors structuring or grouping text into sections corresponding to predefined reporting schemas (e.g., league-specific or team-specific templates) to standardize outputs for downstream applications. For example, the processing circuits can embed metadata tags or identifiers to facilitate searching, filtering, and automated analysis within the digital application. That is, the structured data package can be generated and/or implemented to organize textual and numerical data into fields or tags (e.g., player identifiers, positional classifications, and/or game conditions) for compatibility with analytics systems or digital scouting applications.

In some implementations, the structured data package can include a default template that can be customized by a user of a digital application (e.g., scout and/or coach assist application, digital application 112, team management tools, performance tracking systems, and/or any external scouting platforms). For example, the structured data package can include metadata tags or fields such as a summary, future predictions, personal character, sport-specific character, mental/learning information, durability or health information, general notes, financial information, and/or additional fields or categories for organizing a scouting report.

At block 240, the one or more processors can provide the structured data package. In some implementations, at block 240, the one or more processors can provide the structured data package to a digital application or a scouting computing system. For example, the one or more processors can execute operations to transmit the structured data package via one or more team-specific APIs configured to interface with scouting platforms (e.g., scouting computing system(s) 150 and/or any analytics dashboards, training platforms, and/or any performance review systems) and/or databases for use in analysis or reporting workflows. In some implementations, the structured data package can be provided to a graphical user interface (GUI) of a digital application (e.g., digital application 112) executed on a user device 110, to facilitate users (e.g., scouts, coaches, team managers, analytics personnel, and/or any decision-makers) accessing, reviewing, and/or updating the player profile via interactive elements of the GUI. In some implementations, the one or more processors can generate and provide a downloadable link (e.g., CSV, PDF, and/or other standardized file format) via a digital application for users to download the structured data package for offline review and/or other uses (e.g., integration into external systems). That is, the one or more processors can improve data compatibility by formatting the structured data package according to league-specific or team-specific schemas for integration with analytics platforms, video analysis tools, and/or external scouting databases.

In some implementations, generating the player profile at block 220 can include the one or more processors simulating, using the at least one AI model, the at least one player based at least on the digital content to generate at least one capability corresponding to a position parameter or performance attribute. That is, the one or more processors can train and/or implement one or more AI models to generate a virtual representation of a player (e.g., player model or digital twin) and simulate player interactions based on the digital content and domain-specific modeling parameters. For example, the one or more processors can simulate positional parameters by modeling performance of a player in one or more roles (e.g., positions or actions, such as defensive coverage or offensive route execution). In some implementations, the one or more processors can simulate performance attributes by generating outputs (e.g., metrics or indicators) that assess adaptability, spatial positioning, and/or reaction efficiency associated with one or more attributes of a player (e.g., speed, agility, strength, decision-making abilities, and/or any role-specific skills).

Generally, the virtual representation can be a dynamic model that replicates physical, cognitive, and performance attributes of a player based on real-world data inputs. That is, the virtual representation can combine historical performance metrics, biomechanical motion patterns, and situational data to create an interactive simulation of the capabilities and tendencies of a player. In some implementations, the virtual representation can update in real-time or near real-time to reflect changes in player performance, such as during live scouting or practice sessions. For example, the virtual representation can simulate how a player can perform under different environmental conditions (e.g., varying weather or opponent strategies) or within different team configurations (e.g., specific formations or tactical adjustments). In another example, the virtual representation can generate predictive outputs, such as potential fatigue levels, injury risks, or expected contributions in upcoming games, based on recent performance trends. Additionally, the virtual representation can support scenario modeling by simulating interactions with other players (e.g., team chemistry, defensive matchups) or game-specific contexts (e.g., high-pressure playoff situations, extended game durations).

Additionally, the one or more processors can simulate performance parameters or attributes (e.g., endurance, focus, and/or responsiveness under varying conditions) including high-pressure scenarios (e.g., playoff games) and/or challenging environmental factors (e.g., extreme weather or strong opposing teams) using the digital twin or player model. For example, the digital twin or player model can be used by at least one AI model to simulate or predict expected performance outcomes corresponding with a player (e.g., projected player statistics, team win/loss probabilities, scouting rankings, player development trajectories, and/or indicators relevant to game strategy). That is, the digital twin can include and/or correspond with a dynamic and adaptive data construct or model that integrates static metrics (e.g., height, weight, and/or historical performance) and dynamic inputs (e.g., gameplay footage, scouting notes, and/or real-time and/or near real-time biometric data) and can be used by the AI model to replicate performance parameters associated with a player and/or predict expected performance outcomes (e.g., player statistics, team win/loss percentage, scouting rankings, player development trajectories, and/or any game strategy indicators).

In some implementations, physical performance data can be further applied as input to the at least one AI model to generate the player profile. That is, the one or more processors can utilize physical performance data to dynamically update the player profile with real-time and/or near real-time or historical insights using AI model(s) 136. For example, the one or more processors can process sensor-based inputs to quantify biomechanical factors of a player, such as stride length, gait efficiency, and/or joint flexibility, and/or correlate the metrics with role-specific parameters (e.g., wide receiver agility, goalkeeper reaction time, pitcher arm strength, defender acceleration, and/or any position-specific characteristics) associated with the player. For example, sensor-based inputs can include biomechanical measurements (e.g., joint angles, angular velocities, and limb segment accelerations), physiological metrics (e.g., heart rate variability (HRV), blood oxygen saturation, and/or lactate thresholds), and/or contextual or environmental data (e.g., field temperature, surface hardness, and/or humidity). In some implementations, the sensor-based inputs can be received and/or detected using wearable devices (e.g., smartwatches, fitness trackers, pressure-sensitive insoles), motion capture systems (e.g., infrared-based motion tracking cameras, inertial measurement units (IMUs)), and/or other sensors (e.g., pressure plates, weather monitoring systems, and/or imaging systems). In some implementations, the one or more processors can use physical performance data to calibrate digital twin simulations, such as fine-tuning reaction thresholds based on observed response speeds or modeling metabolic efficiency to predict stamina across varying game conditions. Additionally, the AI model can process trends in physical performance data to highlight areas for improvement or potential risk factors (e.g., injury susceptibility based on repetitive stress metrics).

In some implementations, the physical performance data includes at least one (i) sensor metric corresponding with position tracking or biometric output or (ii) game metric corresponding with an in-game performance. For example, the sensor metric can include a value obtained from one or more sensors (e.g., wearable trackers, optical systems) that measure a spatial location, movement patterns, and/or physiological indicators (e.g., heart rate, acceleration) of a player. That is, sensor metrics corresponding with position tracking can include data such as velocity profiles, spatial trajectories, and/or dynamic movement analysis captured via a wearable device and/or imaging system (e.g., during a medical evaluation, during a combine, during a game or practice session, during training drills, in simulated environments, and/or any real-world scenarios). In another example, sensor metrics corresponding with biometric output can include health-related data points such as heart rates, blood oxygen levels, hydration markers, skeletal or muscular stress indicators, muscular fatigue levels, core temperatures, cardiovascular efficiency rates, and/or other data used to determine health, durability, physical readiness, recovery patterns, and/or adaptability of a player.

In some implementations, the game metric can include quantitative or qualitative measurements derived from actual gameplay events (e.g., yards gained, completion percentage, and/or shots made) reflecting real-time and/or near real-time or logged outcomes of player interactions. For example, game metrics corresponding with in-game performance can include statistical outputs such as scoring contributions, and/or offensive or defensive impact ratings. That is, the one or more processors can input physical performance data (e.g., sensor metrics, position tracking data, biometric output data, game metrics, in-game performance parameters, fatigue levels, reaction time, and/or any measurable indicators) into an AI model to generate and/or update player profiles, textual representations, and/or structured outputs.

In some implementations, generating the player profile at block 220 can include the one or more processors modeling, using the digital content and a sport-specific role dataset, at plurality of role scenarios of the at least one player to generate the plurality of performance parameters including a plurality of role-based performance metrics corresponding to at least one update in the player profile based on a plurality of roles according to the sport-specific role dataset. That is, the one or more processors can analyze the digital content using the sport-specific role dataset to simulate role scenarios and generate outputs representing positional adaptability, effectiveness, and/or decision-making accuracy (e.g., using a digital twin) based on a change or update to a player profile or scouting report. For example, the role-based performance metrics can include a set of measurable indicators that evaluate an effectiveness of a player in performing or completing designated tasks or positional responsibilities (e.g., defensive coverage, offensive route execution, shot accuracy under pressure, positional versatility, and/or any role-specific tactical contributions). In some implementations, the role scenarios can include and/or correspond with positional responsibilities (e.g., offensive, defensive, and/or transitional roles), tactical assignments (e.g., guarding a specific player, executing set plays), and/or contextual adjustments (e.g., adapting to opponent strategies or changing environmental conditions).

In some implementations, an update in a player profile can include modifications to positional metrics, adjustments to tactical effectiveness indicators, refinements to descriptive attributes (e.g., decision-making tendencies or adaptability), recalibration of performance parameters based on newly received gameplay or practice data, integration of contextual information related to opponent strategies or environmental factors, incorporation of predictive trends or scenario-based projections, and/or updates to any other parameters associated with role scenarios modeled using the sport-specific role dataset. That is, simulating can include the one or more processors generating and executing virtual role scenarios by integrating spatial data (e.g., player trajectories), temporal data (e.g., timing of actions within a game sequence), and/or tactical parameters (e.g., predefined play strategies) to predict performance outcomes associated with a player.

In some implementations, generating the player profile at block 220 can include the one or more processors modeling, using the digital content and at least one roster dataset, chemistry of the at one player with at least one roster of the at least one roster dataset to generate at least one of the plurality of performance parameters including a chemistry indicator corresponding to simulated interactions with the at least one roster. That is, the one or more processors can use a roster dataset (e.g., collection of player data, parameters, and/or digital twins of a plurality of players on a team roster) to simulate team interactions and assess coordination, compatibility, and/or adaptability metrics of a player being scouted and/or one or more members of the roster based on gameplay, positional dynamics, and/or historical performance trends of the player and/or team members. For example, a chemistry indicator can include numerical or statistical value reflecting a level of coordination or compatibility between the player and other members of a team. In some implementations, modeling can include integrating spatial data (e.g., player spacing and movement patterns), interaction timing (e.g., pass intervals or defensive rotations), and/or contextual factors (e.g., opponent tendencies or game context) to predict team chemistry outcomes.

In some implementations, the one or more processors can execute operations to determine chemistry indicators by applying AI models (e.g., LLMs, neural networks) to identify correlations between player actions and team outcomes (e.g., scoring efficiency, defensive synergy, assist-to-turnover ratios, passing efficiency, and/or any team performance metrics). In another example, an AI model can perform clustering or classification of player roles and contributions and generate predictive metrics accounting for influences of one or more player roles, contributions, and/or classifications on overall team dynamics in future game scenarios. That is, simulated interactions can include virtual representations of collaborative or adversarial scenarios (e.g., offensive plays, defensive formations) where data from multiple players (e.g., movement trajectories, tactical execution, reaction times) is analyzed to determine contributions of combinations of player actions using player-based and/or team-based outcomes.

In some implementations, generating the player profile at block 220 can include the one or more processors modeling a plurality of event scenarios corresponding to environmental conditions or event conditions to generate at least one of the plurality of performance parameters including a performance metric of the at least one player under at least one (e.g., each) of the plurality of event scenarios. That is, the one or more processors can execute operations to simulate event scenarios (e.g., practice or in-game contexts, environmental contexts, travel schedules, audience engagement levels, and/or any competitive dynamics) using AI models and generate outputs (e.g., performance metrics) indicative of player performance under various conditions. For example, environmental conditions can include weather factors (e.g., rain, wind, and/or extreme temperatures), playing surfaces (e.g., turf, grass, and/or court types), and/or audience variables (e.g., crowd noise levels or attendance). In some implementations, event conditions can include opponent strategies (e.g., offensive or defensive formations), time-based variables (e.g., game duration or overtime scenarios), and/or game phases (e.g., opening plays, first half versus second half performance, final periods, sudden-death scenarios, post-season matches, and/or any time-based performance conditions).

In some implementations, the one or more processors can generate predictive metrics evaluating player adaptability across varying event scenarios by integrating performance attributes associated with a player (e.g., speed, stamina) with situational variables associated with interactions of the player (e.g., game weather, opponent type, game time, team roster dynamics, training schedules, and/or any event-based variables). That is, the one or more processors can determine performance metrics associated with the at least one player under event scenarios by inputting environmental variables (e.g., game location, weather, and/or venue conditions) and player-specific attributes (e.g., endurance, reaction times, and/or decision-making tendencies) into an AI model and receiving corresponding updates to the player profile and/or event-specific performance parameters.

In some implementations, generating the player profile at block 220 can include the one or more processors modeling, in real-time and/or near real-time, the digital content corresponding to a real-time and/or near real-time analysis captured in the at least one captured media segment to generate the sport-specific textual representation. That is, the one or more processors can perform real-time and/or near real-time processing of digital content (e.g., video footage, audio commentary, player tracking data) to analyze and evaluate player actions, decisions, and/or outcomes during a game, practice session, interview, and/or evaluation (e.g., using a digital twin). For example, the one or more processors can input a captured media segment from an evaluation into an AI model configured to extract performance attributes (e.g., movement speed, reaction time, decision-making accuracy) and correlate the extracted attributes with situational variables (e.g., opponent positioning, environmental conditions). In some implementations, modeling can include the one or more processors generating decision probability metrics (e.g., likelihood of successful pass completion, defensive interception rates) or identifying positional tendencies based on observed gameplay patterns in real-time and/or near real-time. That is, modeling can include the one or more processors generating outputs corresponding to decision probability metrics (e.g., likelihood of successful pass completion, interception rates) and positional tendencies (e.g., movement patterns, defensive alignment) for inclusion in a sport-specific textual representation (e.g., output of a player evaluation) and/or player profile.

In some implementations, generating the player profile at block 220 can include the one or more processors modeling, using the digital content and an event log dataset, a player interaction corresponding to recorded event tracking actions between the at least one player and one or more other players to generate the plurality of performance parameters including a plurality of interaction metrics corresponding to interaction effectiveness. That is, an event log dataset can include a collection of recorded historical data capturing player actions, interactions, and/or events during gameplay or practice sessions. For example, recorded event tracking actions can include logged occurrences of gameplay, practice activities, and/or life activities (e.g., in-game performance metrics, practice attendance rates, education, injury history, team meetings, and/or any off-field activities) and corresponding contextual data (e.g., player involved, timestamps, outcomes, statistics, training session results, opponent analysis, and/or any relevant metadata).

In some implementations, an interaction effectiveness can include a measurable impact of engagements of a player with others, such as interaction rates (e.g., frequency of engagements between players), engagement durations (e.g., time spent in interactions), and/or outcome success ratios (e.g., proportion of successful interactions). That is, the one or more processors can analyze the digital content with an event log dataset (e.g., a dataset including recorded historical data of gameplay or practice activities) to model interactions including the at least one player and expected outcomes of the interactions. In some implementations, modeling can include generating outputs reflecting patterns of collaborative actions (e.g., assists, defensive switches) and competitive engagements (e.g., contested shots, turnovers) to identify effectiveness of a player and corresponding role within a team dynamic.

In some implementations, generating the player profile at block 220 can include the one or more processors modeling, using the digital content and a sport-specific role dataset, an in-game interaction corresponding to positional updates of the at least one player to generate at least one of the plurality of performance parameters including a role adaptation metric. For example, a sport-specific role dataset can include data corresponding with one or more positions and associated attributes (e.g., physical requirements, tactical responsibilities, positional tendencies) for roles in various sports (e.g., football, soccer, baseball, basketball, hockey, tennis, rugby, and/or any other organized sports). In some implementations, positional updates can correspond to transitions or changes in a role during gameplay (e.g., shifting from midfield to wide receiver to defensive back in football) and/or modifications in role-specific actions based on situational requirements (e.g., switching from an offensive to defensive possession in basketball). That is, the one or more processors can analyze digital content with the sport-specific role dataset to simulate and evaluate positional updates and corresponding performance parameters associated with a player role (e.g., using a digital twin). In some implementations, modeling can include generating role adaptation metrics that reflect the effectiveness of the at least one player in executing position-specific tasks (e.g., maintaining defensive coverage, completing offensive plays) under varying game conditions (e.g., time constraints, changes in opponent strategies). For example, role adaptation metrics can include summaries of positional effectiveness, assessments of adaptability to dynamic game scenarios, measurements of consistency in executing tactical responsibilities across multiple roles, determinations of alignment with role-specific performance benchmarks, and/or predictions of player impact based on transitions between roles or adjustments to situational demands.

In some implementations, the one or more processors can activate a live scouting mode in the digital application, and/or activating the live scouting mode can include continuously capturing the digital content and applying the digital content as input to the at least one AI model to generate or update the sport-specific textual representation in real-time and/or near real-time. That is, the one or more processors can execute operations to capture and process live video feeds, audio commentary, and/or other player tracking data during an ongoing game, practice session, and/or evaluation event, input the data into the AI model, and/or generate real-time and/or near real-time metrics (e.g., decision probabilities, positional effectiveness metrics) used to update corresponding sections of the sport-specific textual representation. For example, activating the live setting mode can include receiving and/or processing a configuration (e.g., setting, user selection, role-specific filters, game-specific priorities, and/or any custom scouting parameters) from a scouting application (e.g., digital application 112) and continuing to capture data when a user device executing the scouting application closes the scouting application, navigates to a different application or page, and/or deactivates the display screen of the device (e.g., during partial sleep and/or partial deactivation mode).

In some implementations, activating the live scouting mode can include buffering live data in a staging area of a digital application (e.g., a memory buffer or queue of a corresponding user device) to reduce latency by prioritizing latency-sensitive tasks for processing (e.g., modeling content). Generally, a live scouting mode can include or refer to a mobile application setting or configuration used to receive, process, and/or provide output based on real-time and/or near real-time scouting inputs (e.g., real-time and/or near real-time scout and/or coach recordings). In some implementations, the digital application can use the live scouting mode to continuously capture digital content responsive to a navigation action (e.g., closing a page, closing the application, returning to the home screen, switching to a different scouting tool, and/or any system-triggered interruptions) and/or deactivation of a user device presenting the application.

In some implementations, the one or more processors can generate at least one trip schedule based on determining a travel path, event timing conflicts, and/or scout availability of a scout and/or coach. That is, a trip schedule can include a sequence of events, travel arrangements, and/or timing allocations configured for a scout and/or coach to attend one or more events based on event priorities, logistical constraints, and/or personal availability. For example, a travel path can correspond to a route, itinerary, and/or other path generated to facilitate transportation between event venues (e.g., stadiums, practice facilities) accounting for geographic locations, travel times, and/or accessibility considerations.

In some implementations, event timing conflicts can include overlapping or adjacent event schedules that require prioritization or reallocation to provide efficient scout and/or coach coverage, and scout and/or coach availability can refer to operational constraints such as work hours, travel preferences, and/or downtime requirements for the scout and/or coach. For example, the one or more processors can analyze digital content (e.g., event schedules, venue locations, scout and/or coach availability data, team rosters, key player evaluations, and/or any priority data) to generate a dynamic and/or custom trip schedule (e.g., itinerary) that resolves timing conflicts (e.g., scheduling interruptions or other conflicts), and/or identifies efficient travel paths (e.g., timing and/or locations of plane trips, car trips, navigating venues or team facilities, lodging arrangements, meal stops, and/or any scouting-specific logistics) for use by scout. In some implementations, the one or more processors can prioritize events by analyzing player-specific data (e.g., high-priority evaluations, targeted players) and assigning scouts to one or more corresponding events.

In some implementations, the one or more processors can dynamically adjust the trip schedule in response to real-time and/or near real-time updates, such as event delays, cancellations, and/or changes in scout and/or coach availability (e.g., new conflicts). For example, the one or more processors can recalculate a travel path by incorporating real-time and/or near real-time traffic data or adjust timing allocations to reflect updated event schedules. In some implementations, the one or more processors can generate and provide the trip schedule to a scouting application (e.g., digital application 112) for display on a graphical user interface (GUI) or export to a downloadable format (e.g., PDF, CSV, ICS calendar files, mobile-friendly formats, and/or any exportable options).

In some implementations, the one or more processors can generate or update the digital content based on extracting at least one unstructured player metric of the at least one player from the captured media segment. That is, an unstructured player metric can include a player-related data point or observation that is derived from unprocessed media (e.g., audio, video, and/or text). For example, an unstructured player metric can be qualitative or descriptive metric or indicator (e.g., movement pattern, verbal commentary, gesture analysis). For example, unstructured player metrics can include qualitative observations such as movement patterns (e.g., footwork efficiency, defensive spacing), verbal commentary (e.g., scout and/or coach feedback), and/or gestures or body language (e.g., signaling plays, non-verbal communication). In some implementations, the one or more processors can convert an unstructured player metric into a structured metric by applying natural language processing (NLP) to commentary data or computer vision techniques to video data, thereby categorizing qualitative observations into measurable parameters (e.g., acceleration rates, pass accuracy percentages, defensive coverage areas). That is, the one or more processors can update the digital content by associating the structured metrics with additional contextual data (e.g., event timestamps, player identifiers, and/or game phases).

In some implementations, generating the player profile at block 220 can include the one or more processors correlating at least one quantitative player performance metric from processed digital content with descriptive data from at least one observation in the processed digital content to generate at least one alignment metric. That is, an alignment metric can include a value or indicator derived from a determined consistency between observed and computed player data (e.g., performance-consistency score, scout-comment alignment score, expected vs. actual outcome, positional accuracy ratings, efficiency ratios, movement precision scores, and/or any performance indicators). For example, an alignment metric can include a value or indicator derived from assessing consistency or relationships between computed metrics (e.g., numerical outputs, statistical data) and qualitative or descriptive observations (e.g., scout and/or coach feedback, commentary, visual analysis). For example, the one or more processors can process digital content to extract quantitative player performance metrics (e.g., speed, shooting accuracy, reaction times) and compare the extracted metrics with corresponding descriptive observations (e.g., "quick decision-making," "consistent shot placement") to determine alignment metrics (e.g., consistency scores or validation values).

In some implementations, an alignment metric can include a positional accuracy rating or attributes evaluating whether quantitative tracking data (e.g., player positioning, statistics, game-specific movement data, heatmap-based spatial data, and/or any positional parameters) aligns with descriptive observations (e.g., scout-assigned positional tendencies, scout and/or coach observations, defensive zone coverage notes, transition strategy evaluations, and/or any scouting comments). Additionally, the one or more processors can determine alignment metrics based on indicators of performance consistency by comparing expected outcomes (e.g., predicted scoring probabilities) with observed results (e.g., actual goals scored). In some implementations, the one or more processors can refine alignment metrics by incorporating historical data (e.g., past player performance trends, prior scouting reports, role-specific benchmarks, game-specific analytics, and/or any training data sets) and/or context-specific data sets (e.g., sport vernacular or scouting phrases).

In some implementations, generating the player profile at block 220 can include the one or more processors determining at least one evaluation score representing a weighted combination of at least one quantitative player performance metric and at least one scout-assigned grade of the at least one player. That is, an evaluation score can include and/or represent a weighted representation of overall performance of a player (e.g., overall player rankings, skill-assessment indices, grade-combination results, role-specific impact ratings, tactical execution grades, and/or any aggregated scores).

In some implementations, an evaluation score can include and/or represent a composite value derived from integrating objective performance metrics (e.g., speed, shooting accuracy, decision-making metrics) with subjective assessments (e.g., scout-assigned grades or scout-assigned qualitative ratings). For example, the one or more processors can assign weightings to quantitative metrics (e.g., pass completion percentage, goals scored) and/or qualitative scout-assigned grades (e.g., leadership ability, work ethic) based on predefined criteria, personal knowledge of a scout, and/or team- or league-specific standards. For example, the one or more processors can calculate an evaluation score by combining performance metrics (e.g., passing completion percentage, rebound rates, assist ratios, shot-creation success rates, and/or any statistical measures) with a scout-assigned assessment of the player (e.g., strengths, weaknesses, fit, team chemistry, adaptability, and/or any qualitative insights) adjusting the weight of specific performance metrics or grades based on the context of a role, game conditions, and/or expected development in future interactions (e.g., player potential in future in-game interactions).

In some implementations, generating the player profile at block 220 can include the one or more processors generating at least one predictive metric for a future player performance based on historical game data and the digital content corresponding with an identified trend in the at least one captured media segment. That is, a predictive metric for a future player performance can include an extrapolated or estimated outcome representing one or more abilities or achievements of a player in future games on future teams in specific roles (e.g., expected game impact, predicted positional success rates, anticipated contribution, future leadership potential, team fit evaluations, and/or any forward-looking metrics). For example, the one or more processors can use an AI model to analyze historical game data, performance trends, and/or digital content (e.g., video footage, player tracking data) to generate predictions for how a player can perform in future game scenarios (e.g., future season projections, postseason contributions).

In some implementations, the predictive metrics can incorporate past performance in similar environments (e.g., playing against specific opponent types or in high-stakes games) to refine performance expectations in subsequent outcomes with corresponding and/or different environments. Additionally, the predictive metrics can account for changes in player development (e.g., improvement in speed, tactical awareness, and/or decision-making capabilities) and adaptability to new team structures, coaching strategies, and/or changes in league dynamics.

In some implementations, the one or more processors can normalize a plurality of player grades of a plurality of player profiles by applying a calibration function aligning the plurality of player grades of a plurality of scouts and a plurality of players. That is, a calibration function can include weighted averaging, scaling, grade distribution, scout-specific evaluation normalization, and/or techniques used to adjust player grades across scouts and/or players. For example, the calibration function can normalize the player grades by applying a weighted average to account for different grading scales used by various scouts or adjusting player grades based on predefined team- or league-specific benchmarks. In some implementations, the calibration function can apply a scaling factor to adjust for variations in the scoring system and reduce discrepancies between assessments (e.g., scout-assigned grades) of one or more scouts. That is, the one or more processors can apply a calibration function to normalize data from different scouts, teams, leagues, and/or timeframes to improve the overall accuracy and consistency of generated player profiles. For examples, the calibration function can structure and/or organize data from various profiles or scout-assigned scores in a consistent and comparable format or structure that can be used for cross-player, cross-scout, and/or cross-coach analysis.

In some implementations, in response to receiving digital content, the one or more processors can identify environmental data corresponding with the at least one captured media segment. That is, environmental data can include venue information (e.g., a location of the game or event (e.g., stadium or field) and surface characteristics (e.g., turf, grass)), weather (e.g., temperature, wind speed, and/or precipitation), opponent information (e.g., data regarding opposing teams or players), context (e.g., the phase of the game (e.g., first half, overtime) or the stakes of the game (e.g., playoff match, exhibition)), audience (e.g., noise levels or crowd size), timing (e.g., time of day or season), and/or additional information. For example, the one or more processors can analyze captured media content (e.g., video footage or player tracking data) using audio-based techniques (e.g., natural language processing, AI-based modeling, audio classification models, speech-to-text conversion, and/or any soundscape analysis methods) or image processing techniques (e.g., computer vision algorithms, object detection techniques, pattern recognition models, scene segmentation algorithms, and/or any image classification tools) to extract relevant environmental data and associating the extracted data with various player actions or attributes.

In some implementations, the one or more processors can receive environmental data from external sources, such as social media feeds, news outlets, and/or public databases. In some implementations, the environmental data is further applied as input to the at least one AI model to cause the at least one AI model to generate the player profile. That is, the AI model can adjust the player profile (e.g., set of player-specific attributes or performance parameters) to account for changes in performance under different environmental conditions (e.g., predicting player stamina based on environmental factors like heat or wind) or contextual adjustments (e.g., ability to maintain focus in high-pressure game moments).

In some implementations, generating the structured data package at block 230 can include the one or more processors integrating, from one or more data sources, third-party data into the structured data package corresponding with the player profile. That is, third-party data can include external data (e.g., social media content, news articles, and/or industry-specific reports), and/or the one or more processors can embed and/or organize at least a portion of the external data into a scouting report or output (e.g., structured data package). For example, the data processing system 130 can extract relevant social media posts or news articles from data received from data sources 160 (e.g., various external data sources, APIs, and/or other interfaces) and associated with a player, and/or can further correlate the extracted third-party data with performance data to determine status, reputation, and/or other factors that can influence future performance of the player. In some implementations, the third-party data can include information on player endorsements, off-field activities, and/or any other public or private data that can be used to adjust or refine player evaluation metrics. In some implementations, the third-party data can include performance analytics from other teams, league databases, and/or other scouting platforms, and/or the one or more processors can cross-reference the third-party data with internal player data to refine player evaluation metrics, predict future performance trends, and/or assess potential fit within team- or league-specific dynamics.

In some implementations, the one or more processors can transmit, to the digital application, at least one partially captured media segment. That is, the one or more processors can upload portions of the captured media (e.g., portions of video or audio clips) to a queue or staging area of the application (e.g., device memory queue or buffer) to facilitate low-latency updates for scouts in the field. For example, the one or more processors can model audio content into text as the audio is recorded and display the outputted content to the scout and/or coach as the text becomes available, and/or further continue processing the output and summary in the background. In some implementations, the one or more processors can prioritize outputting and displaying relevant portions of the media, such as player actions or observations, to provide the scout and/or coach with pertinent information and reduce perceived latency by displaying rough or partial transcriptions and replacing the rough or partial transcriptions with AI-summarized results once processing is complete. For example, the one or more processors can generate tags or markers to indicate a transcription is rough or partial (e.g., a "preliminary" tag) and present the tags or markers with the transcription via a user interface of the digital application. In some implementations, the one or more processors can update the digital application with the structured data package responsive to generating the structured data package. For example, the one or more processors can transmit structured data to the digital application to update the display of one or more player profiles. In some implementations, one or more processors can provide the structured data package for display via a graphical user interface (GUI) of the digital application in a table or list format, as described further with regards to FIG. 3 and FIGS. 4A-4C. That is, updating the digital application can include transmitting structured data to the GUI to update player profiles, refresh player attributes, modify player rankings, adjust data values, filter or sort player lists, add or remove data entries, generate new display fields, modify charts or graphs, update statistical representations, highlight specific player characteristics, apply performance benchmarks, recalculate player scores, and/or update data tables.

In some implementations, the one or more processors can provide, in the digital application, a text editing interface to update a portion of the structured data package. That is, the one or more processors can present a user interface element (e.g., text box, editable field, annotation tool, rich text editor, and/or any interactive input element) configured for the scout and/or coach to manually input, refine, and/or add additional data, notes, and/or insights to the structured data package (e.g., observations or analysis of player performance). For example, the text editing interface can be designed to receive and/or process free-text input, numerical data, and/or selections from predefined lists or drop-down menus of the digital application. In some implementations, the one or more processors can, responsive to receiving an interaction with the text editing interface, update the portion of the structured data package and update the player profile. That is, receiving the interaction can include detecting input from the user through the interface (e.g., clicking on the field, typing text, selecting a dropdown option, and/or any other form of data entry based on a selection, trigger, and/or other user interaction (e.g., saving a note, confirming a change, submitting revised data, tagging a specific metric, highlighting an observation, and/or any update action).

In some implementations, updating the portion of the structured data package can include modifying existing data entries (e.g., adjusting player metrics, adding comments, refining observations), adding new sections of data, and/or updating previously entered data with updated information based on scout and/or coach input. In some implementations, updating the player profile can include incorporating the newly updated data into the player-specific profile, recalculating performance metrics, adjusting player rankings, and/or modifying any player-specific attributes affected by the updated information.

In some implementations, the one or more processors can continue capturing the at least one captured media segment responsive to a navigation closing the digital application or a display of a user device deactivating. That is, the one or more processors can implement background tasks by utilizing system-level background processing services provided by an operating system of a user device executing the digital application when the digital application is closed or deactivated. For example, when the application transitions to the background or the screen is turned off or closed, the one or more processors can transfer or delegate media capture to a background process (e.g., service or daemon) that operates asynchronously from a main user interface thread and/or store a portion of captured media data in a memory queue or buffer (e.g., persistence cache).

In some implementations, the at least one sport-specific textual representation includes a plurality of player-specific performance metrics and corresponding environmental or interaction data, and/or the plurality of performance parameters include one or more metrics or indicators corresponding with capabilities, tendencies, and/or achievements of the at least one player. That is, the plurality of player-specific performance parameters include one or more metrics or indicators associated with player performance and the corresponding environmental or interaction data can include data derived from gameplay data, player interactions, and/or contextual factors associated with the player performance. In some implementations, the one or more processors can dynamically update the plurality of performance parameters based on new data inputs, including real-time and/or near real-time gameplay observations, player actions, environmental conditions, and/or interactions with other players.

In some implementations, training the at least one AI model includes the one or more processors updating one or more modeling parameters used by the at least one AI model in generating one or more subsequent outputs based on the sport vernacular and historical labeled digital content. That is, the one or more processors can cause an AI model to adjust internal parameters (e.g., weights, biases, learning rates) in response to new input data (e.g., labeled player performance data, historical game footage, commentary data) to improve performance of the model and facilitate accurate predictions or classifications in future tasks. For example, the one or more processors can update the model parameters by applying machine learning or neural network techniques (e.g., a gradient descent algorithm, a backpropagation algorithm, adaptive learning algorithms, and/or any optimization techniques) to minimize errors between predicted and actual outcomes based on labeled training data. In some implementations, the model can be retrained periodically or incrementally as new labeled content becomes available. In some implementations, the sport vernacular and historical labeled content can include domain-specific language or sport-specific terminology (e.g., sports vocabularies, scouting vernacular, position-specific jargon, league-specific slang, and/or any contextual phrases) and/or historical audit trails of changes performed by an AI model in generating previous outputs.

In some implementations, the sport-specific template corresponds to a predefined schema identifying at least one configuration or state of the digital application. That is, the digital application can provide an interface for a user to edit a schema or template object, and/or the digital application can automatically provision a template based on application settings or user selections (e.g., an application state corresponding to a selected team or league). For example, the user can choose from predefined templates specific to a given sport or league, and/or the application can automatically configure the schema based on the team or league context selected by the user (e.g., application state). In some implementations, the schema can include fields and configurations that align with the specific data requirements of different teams or leagues, such as player roles, performance metrics, and/or off-field parameters.

In some implementations, organizing the portion of the sport-specific textual representation includes the one or more processors mapping the portion to one or more fields of the structured data package based on the predefined schema. That is, the one or more processors can categorize the data based on the schema by identifying the relevant attributes of the textual content (e.g., player statistics, game context, performance trends) and mapping the extracted textual content to corresponding fields in a structured data package (e.g., based on metadata tags or labels identifying sections or fields). Additionally, the one or more processors can dynamically adjust the structure of the data package as new data is input or the application context changes (e.g., switching to a different league or team configuration) by replacing existing data and/or embedding additional data.

In some implementations, the one or more processors (e.g., using one or more AI models) can identify and/or associate players or teams without explicit context or predefined identifiers. For example, the AI model(s) (e.g., AI model(s) 136) can analyze textual representations, metadata, or other inputs (e.g., player statistics, game performance data, and/or scouting notes) to infer the identity of a player or team. For example, the AI model(s) can apply natural language processing techniques to detect references to specific players or teams (e.g., analyzing mentions of player names, nicknames, or team affiliations). In some implementations, the AI model(s) can use machine learning models or neural networks trained on historical and/or domain-specific datasets to recognize patterns or correlations in the data and determine player or team identities and/or associations. For example, the AI model(s) can analyze player statistics or attributes (e.g., average speed, scoring frequency, position, height, weight) and/or environmental data (e.g., game location, opponent teams) to identify a likely and/or estimated player or team associated with a game event or performance metric (e.g., in the absence of direct references to the player or team identity).

In some implementations, the one or more processors (e.g., using one or more AI models) can perform video analysis using vision models (e.g., object detection models, pose estimation models, action recognition models) to extract and analyze data from captured video content. That is, the AI model(s) can include and/or execute a vision model (e.g., a trained neural network for image and/or motion recognition) to process visual inputs such as video frames and/or image data. For example, the vision model can identify patterns or anomalies in player movements by analyzing kinematic data (e.g., joint angles, limb velocities, accelerations) derived from video content. In some implementations, the vision model can detect potential injuries and/or future vulnerabilities (e.g., to injuries, such as such as ACL tears, rotator cuff strains, hamstring pulls) by identifying irregularities in biomechanical motion (e.g., asymmetry in gait, reduced range of motion, deviation from expected movement patterns, variations in joint angles, uneven weight distribution, and/or any anomalies identified using, for example, object detection and/or pose estimation models to analyze joint trajectories or movement sequences).

In some implementations, the vision model can identify or evaluate muscle and/or joint movements by calculating biomechanical metrics (e.g., torque generation, force application, and/or joint stability) and comparing the metrics to predefined benchmarks (e.g., range of motion thresholds, optimal force distribution patterns) and/or role-specific standards (e.g., acceleration thresholds, angular velocity norms) for positional roles or performance expectations (e.g., jumping mechanics for forwards, rotational velocity for pitchers, stride length for sprinters, swing dynamics for batters, throwing mechanics for quarterbacks). For example, the vision model can analyze throwing mechanics to detect inefficiencies that can reduce performance or increase injury risk. The vision model (e.g., as a component of the AI model(s) 136 where it integrates motion capture data with biomechanical analysis, and/or as a separate model configured to evaluate joint trajectories, muscle activation patterns, and/or force vectors) can be trained and implemented by utilizing annotated datasets of throwing motions, biomechanical benchmarks, and sport-specific performance metrics.

In some implementations, prior to inputting the frames and/or captured video segments into the vision model, a modeling system (e.g., the modeling system 134) can preprocess the input data by normalizing frame resolutions, enhancing image quality, and/or segmenting key regions of interest (e.g., joints, limbs, and/or motion trajectories). For example, the modeling system can apply noise reduction techniques to improve clarity, crop frames to focus on relevant actions (e.g., a throwing motion of a pitcher), and annotate frames with positional markers for improved feature detection. In some implementations, the vision model can identify player actions and/or interactions in a team context (e.g., analyzing coordination during defensive formations or offensive plays). For example, the vision model can detect and classify movement sequences such as sprinting, cutting, or pivoting and assess an effectiveness of the sequences or movements (e.g., relative to game strategy and positional requirements).

In some implementations, the one or more processors can grant and/or restrict access to various data, resources, features, and/or functionalities of a digital application based on access controls. For example, the one or more processors can implement RBAC controls, multi-tenancy refactoring, username or password requirements, multi-factor authentication requirements, and/or other security controls (e.g., encryption). In some implementations, the one or more processors can restrict or grant access to data, resources, features, and/or functionalities including creating and/or activating new client accounts for teams or organizations, configuring team branding including primary and secondary colors, defining sport-specific vocabularies for evaluation reports and key terms used in transcription AI services, setting up evaluation report categories, inviting and managing users via email and password with the ability to grant or revoke access for individuals and managing user permissions within a client organization, generating unique API keys or tokens for secure data access and integrating with external systems, accessing specific data (e.g., updates, syncs, and/or application data), deactivating or deleting user accounts, monitoring client and user-specific statistics including usage stats and player-specific analytics, accessing recordings (e.g., implementing recording limits), accessing the application in an offline mode, downloading and accessing all reports (e.g., player profile reports) in various formats (e.g., PDFs, CSVs, and/or other formats) for offline use, configuring API key or token management for client data access, and providing API documentation and playground tools to test and integrate client login using keys or tokens for accessing data (e.g., player reports).

In some implementations, the one or more processors can manage cloud-based infrastructure to support multi-tenant operations and can maintain data isolation by scoping databases to specific cloud projects and associating operational parameters (e.g., API keys, tenant configurations, and instance settings) with at least one (e.g., each) project. In some implementations, the one or more processors can configure access control policies to restrict visibility of transcriptions, summaries, and related data such that individual users access can access user-specific data and administrators can access data across multiple users.

In some implementations, the one or more processors can establish and manage a centralized repository for player data to provide structured access to authorized parties (e.g., teams, leagues, schools). For example, the one or more processors can implement hierarchical data organization schemas and configure data ingestion pipelines to support both push-based and pull-based data flows from the centralized repository. In some implementations, the one or more processors can expose configurable APIs to authorized parties for retrieving player reports and associated data and can provide access scoped to parties based on permissions (e.g., team identifiers, scout and/or coach identifiers, or positional attributes). For example, the processors can filter API responses based on one or more request parameters, such as player IDs, team IDs, positional data, and/or predefined date ranges, and generate customized data outputs based on the request parameters.

Additionally, the one or more processors can implement one or more data backup techniques to protect stored data (e.g., automated replication pipelines to store data across geographically distributed locations, scheduled copies or snapshots of stored data, retention policies, etc.). In some implementations, the one or more processors can perform database scoping to organize and isolate data into specific categories and databases by maintaining common data (e.g., user access roles, team metadata, and server configurations) in a default database while associating team-specific data (e.g., formatted summaries, player states, scouting summaries, and pending requests) with individual team databases. In some implementations, the one or more processors can isolate and protect data by using specific databases to stage requests (e.g., incoming uploads or requests readied for summary workflows) and providing specific pipelines for tasks (e.g., report generation pipeline, data access pipeline, etc.).

Figure 3:
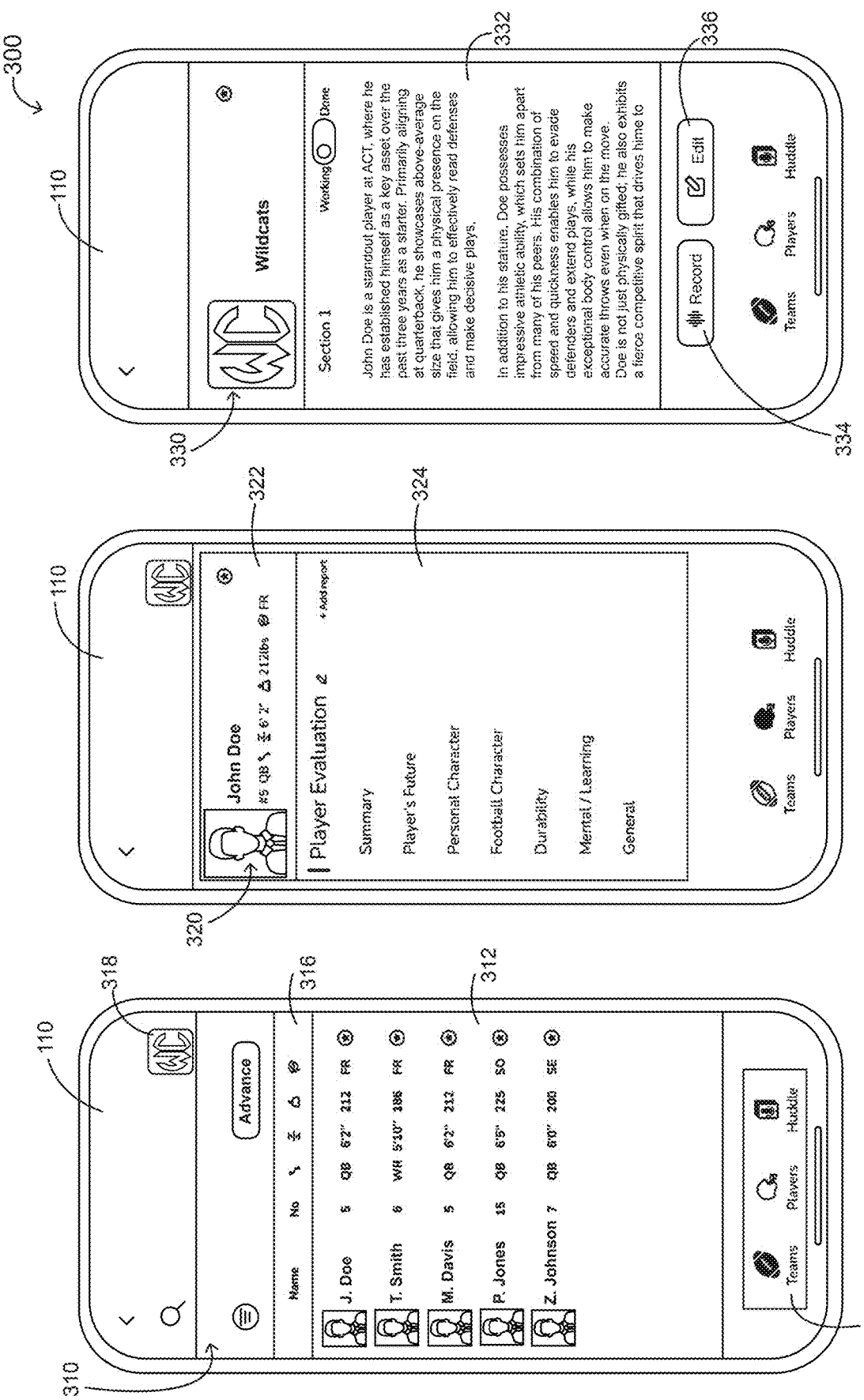
FIG. 3 depicts one or more user interfaces for player modeling using captured multimedia data, in accordance with some implementations of the present disclosure.

Referring now to FIG. 3, one or more user interfaces 300 for player modeling using captured multimedia data are shown, according to some implementations. For example, the one or more user interfaces 300 can include graphical user interface (GUI) 310, GUI 320, and/or GUI 330, which can be presented and/or displayed via a digital application (e.g., digital application 112) executed by one or more user devices 110. In some implementations, the GUI 310 can include a list of player profiles 312, navigation elements 314, categories 316, and/or content 318. For example, the list of player profiles 312 can include various performance parameters, positional attributes, assigned roles, and/or other data associated with a player (e.g., name, number, position, height, weight, college year or class, experience, team affiliation, scouting grades, and/or any relevant player details). In some implementations, the list of player profiles 312 and/or other data entries presented via the digital application can be unsorted or sorted (e.g., alphabetically, reverse-alphabetically, chronologically or reverse-chronologically by date of report or evaluation completion, by position, by grade, etc.).

In some implementations, the digital application of the user device 110 can provide the list of player profiles 312 via the GUI 310 responsive to an interaction (e.g., user input) received via one or more of the navigation elements 314 (e.g., a user pressing a "players" button). In some implementations, the GUI 310 can display a listing or player profiles (e.g., random or unorganized listing) and can further organize or filter the player profiles based on or more of the categories 316. For example, the categories 316 can correspond with a sports-specific template used for generated structured scouting reports or outputs.

In some implementations, the list of player profiles 312 can include tags (e.g., highlighted or starred profiles) that can be dynamically assigned by a scout and/or coach or other user of the digital application. In some implementations, the content 318 can include an icon (e.g., team logo) or other team- or league-specific information associated with a configuration of the digital application and/or a user of the user device 110. In some implementations, the list of player profiles 312 can include and/or correspond with selectable and/or interactive elements that can direct a user of the digital application to a player page corresponding with a selected player.

In some implementations, the GUI 320 can include statistical data or physical attributes 322 of a selected player profile and a player evaluation 324 of the selected player profile. For example, player evaluation 324 can include a player profile and associated categories associated with the player, such as a summary section, a future section, a personal character section, a sport-specific character section, a durability or health section, a mental/learning section, and/or a general section. In some implementations, in response to an interaction or user selection (e.g., a selection of an edit button), the GUI 320 can provide access for a user to interact with and/or update the player evaluation 324. For example, the GUI 320 can update one or more of the categories associated with the player evaluation 324 (e.g., removing sections, adding data to sections, adding additional sections, reordering categories, editing textual descriptions, and/or any customization actions) responsive to input via the user device 110. In some implementations, the player evaluation 324 can include and/or correspond with selectable and/or interactive elements that can direct a user of the digital application to a page or view corresponding with a selected category of the and/or scouting data (e.g., a generated output and/or summary) corresponding with player evaluation 324 (e.g., a summary or report view).

In some implementations, the GUI 330 can include a summary or report view including a scouting data 332 (e.g., output and/or summary corresponding at least one section of a player evaluation 324), a recording element 334, and/or an editing element 336. That is, the scouting data 332 can include a sport-specific textual representation of a player performance and/or an updated textual representation (e.g., summary) generated by an AI model. In some implementations, the GUI 330 can receive a selection of the recording element 334 and activate an audio interface (e.g., microphone) of the user device 110 to cause the user device 110 to capture a media segment. For example, the GUI 330 can cause the digital application to transmit the media segment to one or more AI models, which can perform text-to-speech processing to generate an output of the media segment and generative processing to update the output, and/or the digital application can receive and present the updated output via the GUI 330 as scouting data 332.

In some implementation, the GUI 330 can receive a selection of the editing element 336 and display an editing interface that can be used to adjust or modify the captured media segment and/or corresponding scouting data 332. For example, a user of the digital application presenting GUI 330 can manually adjust textual information included in the scouting data 332 using an editing interface and/or input element (e.g., keyboard) presented in response to the selection of the editing element 336. In some implementations, the GUI 330 can include addition elements and/or content, such as a status button, and/or the user can alternate the status button from a "working" or "in progress" state to a "done" or "completed" state to indicate the progress of the scout and/or coach in completing a player evaluation. In some implementations, in response to an interaction transitioning the status button into a completed or finished state, the digital application can update the scouting data 332 and/or player evaluation 324. For example, the digital application can update the list of profiles 312 to include the updated player evaluation 324 and/or related data associated with the evaluated player.

In some implementations, the digital application (e.g., via one or more interfaces or GUIs) can integrate various functionalities for generating, updating, and/or presenting scouting data via a user device (e.g., user device 110). For example, the digital application can receive voice inputs from a scout and/or coach through an audio interface, process the inputs to generate outputs (e.g., sport-specific textual representations), and/or create structured summaries using one or more linked AI models. In some implementations, the digital application can present formatted reports via GUIs, such as GUI 330, for review and/or interaction by a scout and/or coach or another user. In some implementations, the digital application can link the scouting data to player profiles (e.g., profiles displayed via GUI 310) or evaluation summaries (e.g., summaries displayed via GUI 320) and/or provide the scouting data to one or more external systems (e.g., third-party APIs, team-specific or league-specific workflows, training dashboards, analytics systems, and/or any external reporting platforms).

In some implementations, the digital application (e.g., via one or more interfaces or GUIs) can integrate and/or update digital twins of players. For example, the digital application can use integrated physical performance data or metrics (e.g., positional attributes, role-specific outcomes, biometrics, and/or other performance-related data) to model and simulate individual player outcomes by creating a digital representation of player attributes and capabilities. In some implementations, the digital application can use one or more GUIs to display simulation data associated with one or more player evaluations, team performance outcomes, and/or game scenarios modeled using a digital twin. For example, the one or more GUIs can display scenario modeling results, including simulations of player roles (e.g., positions, situations, high-pressure plays, critical endgame moments, and/or any key scenarios) and associated performance outcomes. For example, the one or more GUIs can display team chemistry analysis data indicating the impact of player interactions and positional configurations on overall team performance.

In some implementations, the one or more GUIs can display game situation modeling results, such as simulated offensive or defensive plays, and/or expected outcomes based on player attributes and/or environmental or contextual inputs. Additionally, the one or more GUIs can display results from a game simulation modeler, including real-time and/or near real-time decision probability analysis and predictive metrics that quantify the likelihood of specific outcomes based on simulated scenarios (e.g., the probability of a successful pass completion or defensive stop under varying play configurations). In some implementations, the one or more GUIs can display player interaction modeling results, including machine learning-based predictions of player behaviors and interactions under defined conditions (e.g., changes in player positioning, shifts in team strategy, and/or adjustments in response to opponent actions). In some implementations, the one or more GUIs can display improved strategies (e.g., modeled offensive plays or defensive alignments tailored to scenarios) and/or training goals (e.g., rehabilitation plans, nutrition plans, workout programs, mental conditioning routines, positional skill drills, and/or any custom training regimens) based on simulation data and predicted performance outcomes.

In some implementations, the digital application (e.g., via one or more interfaces or GUIs) can integrate analytics functionalities to support player evaluations, performance tracking, and/or scouting workflows. For example, the digital application can perform and display player comparisons by integrating performance data with scouting observations (e.g., physical attributes, positional metrics, and/or skill-based evaluations) to provide comprehensive assessments of individual players. In some implementations, the digital application can identify patterns across multiple scouting reports using pattern recognition techniques or artificial intelligence algorithms (e.g., analyzing trends in player performance, recurring evaluation criteria, statistical outliers, longitudinal growth metrics, and/or any anomaly detection insights) and present the results via one or more GUIs. For example, the application can display normalized player grades calculated across multiple scouts, teams, and/or leagues to provide a unified evaluation framework and predictive metrics for assessing player development potential.

Additionally, the digital application (e.g., digital application 112) can generate context-aware player profiles by integrating game film analysis with environmental context data (e.g., weather conditions, opponent quality, and/or game venue). In some implementations, the digital application can further enhance player profiles by integrating additional data sources (e.g., social media activity, news reports, and/or fantasy sports analytics) to provide a view of player attributes and associated external influences. Additionally, the digital application can analyze performance variability to identify trends or deviations in player performance across different conditions or time periods and can present the results via one or more GUIs for review and analysis.

In some implementations, the digital application (e.g., via one or more interfaces or GUIs) can support live scouting workflows by processing and displaying data in real time. For example, the digital application can display modeled content from audio inputs in response to identifying a rough or partial transcription is available from a backend system (e.g., text-to-speech model, AI model, natural language generation algorithms, speech recognition engines, and/or any real-time processing tools).

In some implementations, the digital application can dynamically update the displayed content to include one or more GUIs with summarized results overriding the initial output (e.g., AI-refined summaries or reports). In some implementations, the digital application can present one or more GUIs for recording and upload queuing for voice notes created by scouts. For example, the digital application can be used to perform one or more actions on a recorded clip, such as uploading the clip, reviewing the clip to decide whether to upload or delete the clip, and/or continuing to record additional clips. In some implementations, the digital application can stage previously recorded clips locally on the user device (e.g., in memory or a cache) until the clips are successfully uploaded to a backend system. In some implementations, the digital application can maintain recording functionality in the background when the scout and/or coach switches to another application, navigates to a home screen of a corresponding device, and/or otherwise in response to deactivation of the display of one or more GUIs.

In some implementations, the digital application (e.g., via one or more interfaces or GUIs) can continuously function offline or in limited connectivity scenarios. For example, the digital application can be used by scouts to record voice notes while the device is disconnected from a network or operating in airplane mode. For example, recorded voice notes can be queued in an in-app staging area until the application detects connectivity and uploads the notes to a backend system. In some implementations, the digital application can implement retry logic for failed upload attempts. For example, the retry logic can account for device connectivity and use exponential backoff algorithms to manage retry intervals. In some implementations, successfully uploaded voice notes can be cleared from the local staging area to prevent duplicate uploads.

Additionally, the digital application can retain a local state of voice notes (e.g., incomplete, staged, completed, ready for processing, uploaded with errors, marked for review, and/or any queued state) pending successful uploading of the voice notes to a text-to-speech or AI model. The digital application can also provide a user interface to access and interact with staged voice notes (e.g., playing back a recording, appending additional recording, removing a recording from the upload queue, editing note metadata, flagging priority notes, and/or any note management actions).

In some implementations, the digital application (e.g., via one or more interfaces or GUIs) can integrate automatic linking functionalities to associate scouting notes, reports, annotations, transcriptions, and/or other data with relevant player or team profiles. For example, the digital application can link (e.g., automatically) players mentioned in an output to corresponding profiles (e.g., player profiles displayed via one or more GUIs) based on metadata tags, identifiers, and/or associated data.

In some implementations, the digital application can associate scouting notes with team scouting reports stored in a database or backend system. Additionally, the digital application can perform batch attribution by mapping one or more notes or reports to data entries or profiles associated with multiple players and/or teams. In some implementations, the digital application can provide auto-suggestions for player or team names based on the outputted content (e.g., using a large language model to identify potential matches). Additionally, the digital application can facilitate manual selection of players or teams via interactive elements (e.g., dropdown menus or selectable lists) to refine or confirm the attribution.

In some implementations, the digital application (e.g., via one or more interfaces or GUIs) can display text of an output with one or more terms, player names, and/or team identifiers emphasized to visually indicate an association with one or more corresponding profiles (e.g., player profiles, team profiles, scouting reports, game summaries, and/or any contextual data entries). In some implementations, the digital application can provide GUIs to annotate outputs (e.g., adding comments or notes) or emphasize terms or sections of text (e.g., using highlighting tools). In some implementations, the digital application can attach or embed metadata to outputs to improve attribution accuracy (e.g., date and time stamps, GPS location, and/or event identifiers, such as game or practice details).

In some implementations, the digital application (e.g., digital application 112) can integrate with one or more additional applications. That is, the digital application (e.g., via one or more interfaces or GUIs) can integrate with native or third-party applications executed by the user device (e.g., user device 110) to facilitate scouting workflows. For example, the digital application can interface with native audio recording applications (e.g., a memo app, a camera roll app) to receive recorded audio observations using a native application (e.g., Voice Memos, Voice Recorder) and can automatically and/or otherwise detect and retrieve access the recordings for analysis (e.g., modeling, transcription, annotation, and/or metadata extraction). That is, the digital application and/or the user device (e.g., user device 110) can access the native application by using application programming interfaces (APIs) or file system monitoring mechanisms. For example, the digital application can include and/or execute a background process or service to monitor folders or file paths (e.g., a directory where the native app stores recordings) stored on the user device for added files (e.g., new recordings). Additionally, the data processing system (e.g., data processing system 130) can interface with the user device to obtain the native application data by establishing a secure data connection, invoking platform-specific APIs, or syncing user-authorized files for ingestion. For example, the digital application can request user authorization to link with the native application and periodically scan the linked directories for newly added recordings. In response to detecting a recording from a native application, the digital application can ingest the audio file and process the audio file using one or more AI models to generate scouting notes and/or summaries.

Figure 4A:
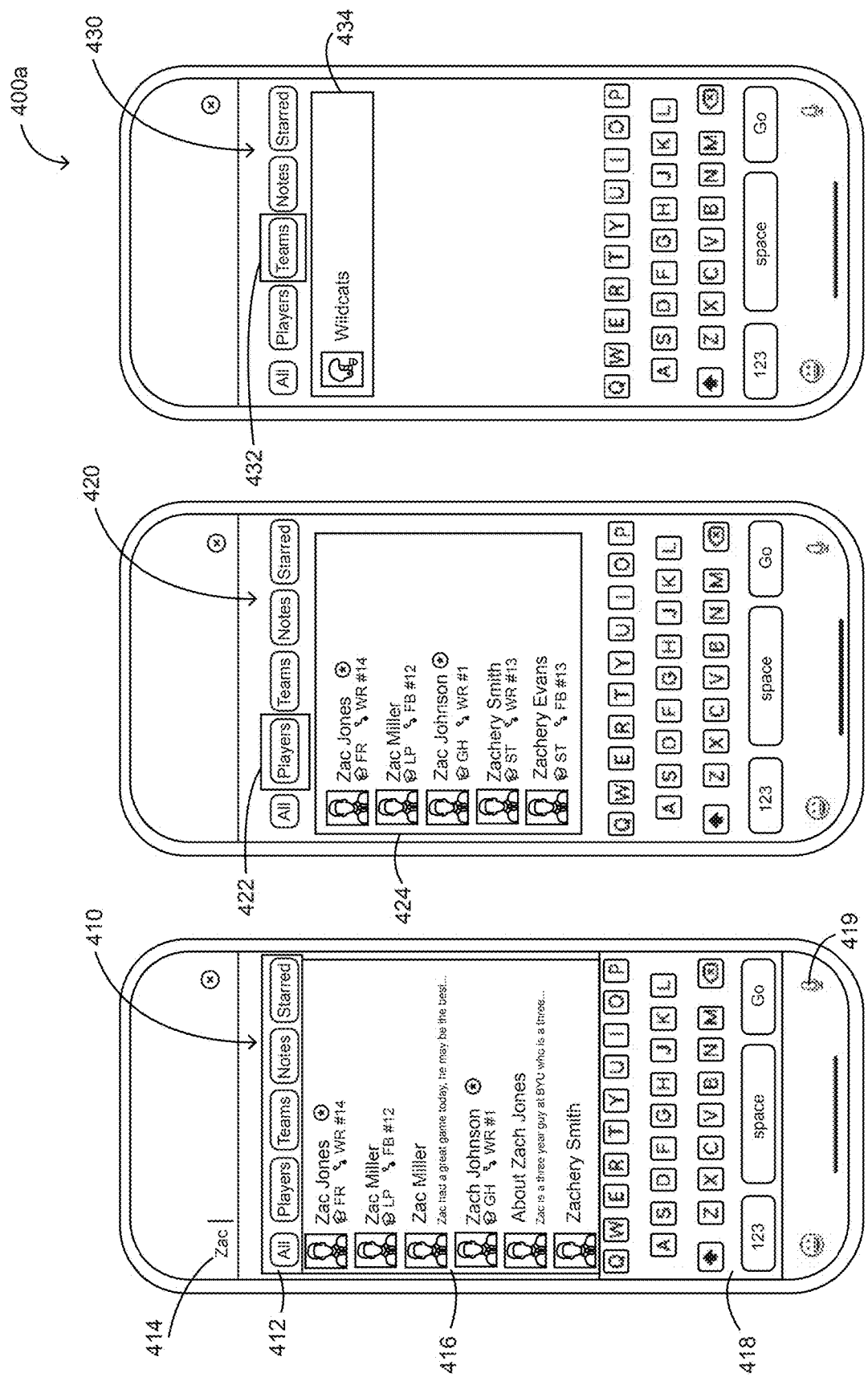
FIGS. 4A-4C depict one or more user interfaces for player modeling using captured multimedia data, in accordance with some implementations of the present disclosure.
Figure 4B:
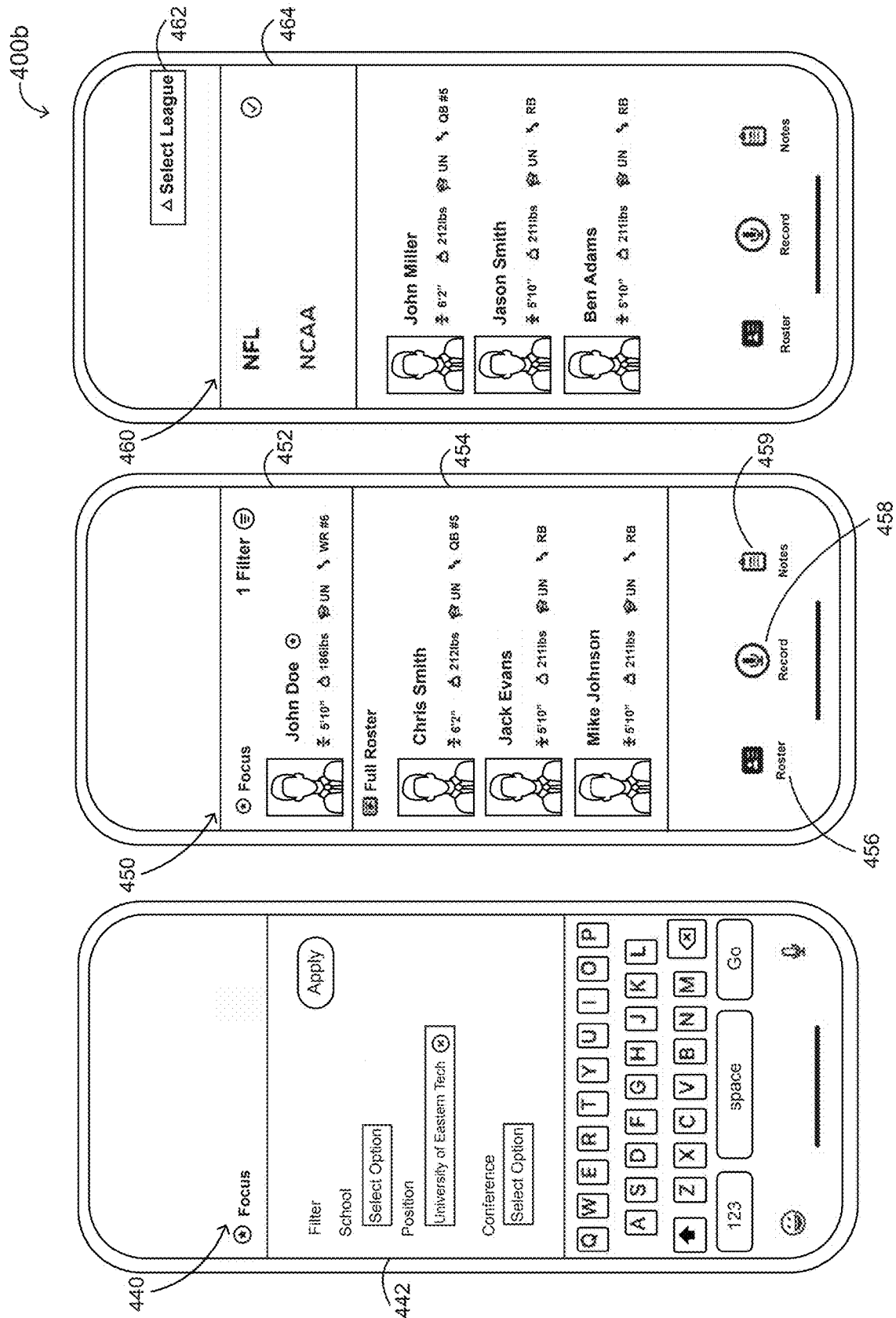
Figure 4C:
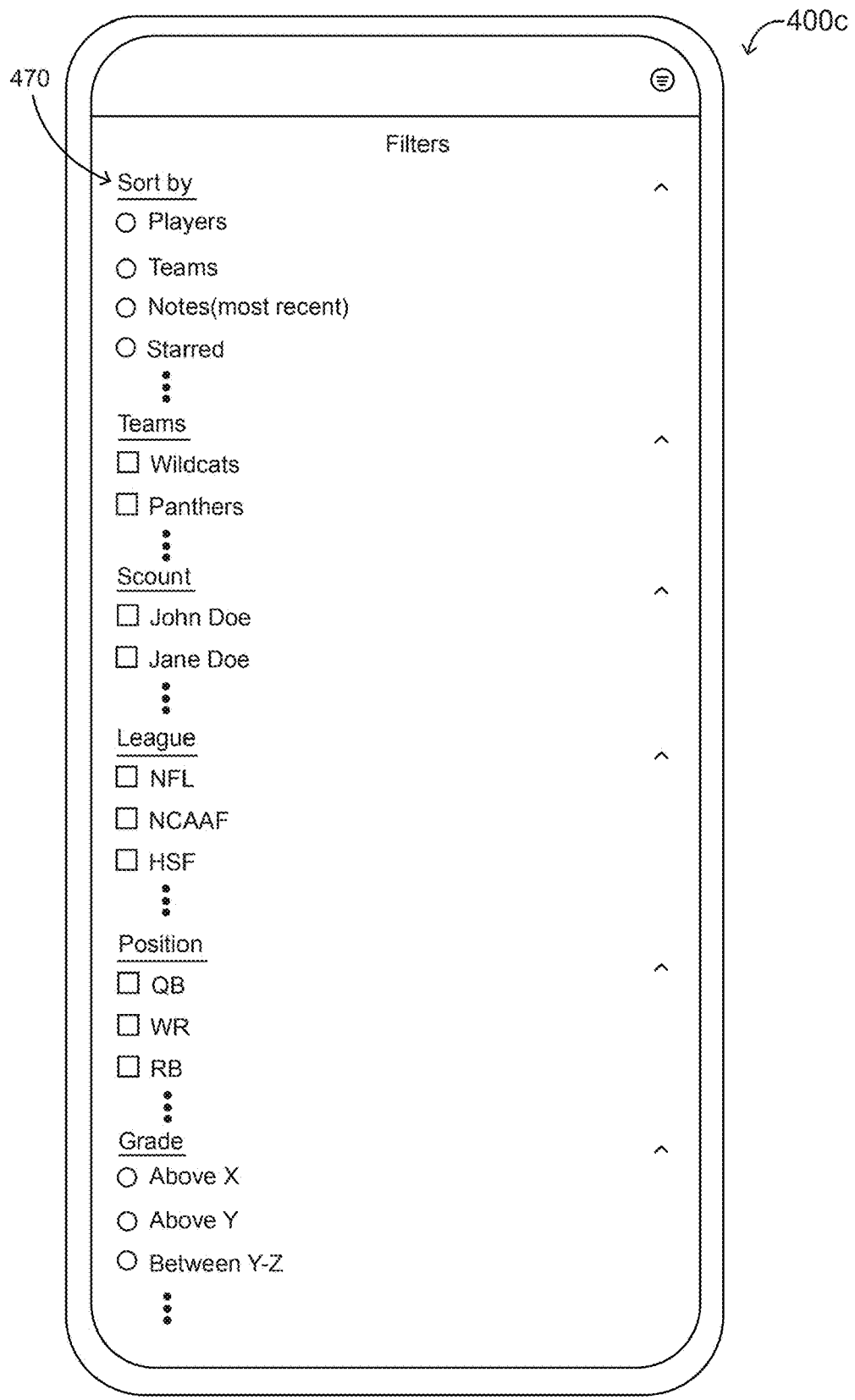

Referring generally to FIGS. 4A-4C, one or more user interfaces 400a-400c for player modeling using captured multimedia data are shown, according to some implementations. Referring now to FIG. 4A, the one or more user interfaces 400a shown can include graphical user interface (GUI) 410, GUI 420, and/or GUI 430, which can be presented and/or displayed via a digital application (e.g., digital application 112) executed by one or more user devices (e.g., user devices 110). In some implementations, the GUI 410 can include a search or filtering interface including one or more filter options 412, a search bar 414, a list of player profiles or data 416, a keyboard element 418, and/or a microphone element 419. That is, the GUI 410 can initially present an unsorted list of content, profiles, entries, player names, player attributes, team names, notes, reports, and/or other data or elements corresponding with the list of player profiles or data 416. In some implementations, the GUI 410 can receive an input via microphone element 419 and select an audio input source. For example, a user device can include multiple audio input sources (e.g., an internal or built-in microphone on the user devices, Bluetooth headsets or microphones, etc.).

In some implementations, the GUI 410 can present an audio selection interface including selectable options corresponding to at least one (e.g., each) of the audio input sources (e.g., for a scout and/or coach to select a preferred recording source). In response to a selection of one or more of the selectable audio input options, the GUI 410 can cause the user device executing the digital application to activate the selected input device. Activating the input device can include establishing a communication link between the user device and the selected audio source (e.g., pairing with a Bluetooth microphone or switching to a wired external microphone), configuring device drivers to recognize and route audio signals from the selected input, and initializing audio capture processes with parameters optimized for the selected source (e.g., sampling rate, bit depth, and input sensitivity). Additionally, activating the input device can include disabling other conflicting input sources to prevent interference.

In some implementations, the GUI 410 can update the displayed list of player profiles or data 416 responsive to an interaction with one or more of the filter options 412, the search bar 414, the list of player profiles or data 416, the keyboard element 418, and/or the microphone element 419. That is, the GUI 410 can receive text input entered in the search bar 414 using the keyboard element 418 and/or audio input from microphone element 419 and dynamically adjust and/or update the arrangement of one or more data elements included in the list of player profiles or data 416 to reflect the updated received inputs. For example, in response to a search input via the search bar 414 entering at least a portion of an identifier or attributes corresponding with one or more players (e.g., a portion of a first name, a position, team name, skill level, and/or any relevant filter criteria), GUI 410 can select and present one or more selected profiles or data corresponding with the search input. For example, the digital application can process data entered in the search bar 414 using one or more search-based API platforms (e.g., full-text indexing and search services), and the search-based API can dynamically match search queries against indexed fields (e.g., player names, attributes, team associations, and/or performance metrics) and return ranked or filtered results including various data types via the GUI 410.

In some implementations, the GUI 420 can include a selected filter 422 and selected profiles or data 424. For example, in response to a selection of one or more of the filter options 412, the GUI 420 can provide a list of selected profiles or data 424 from the list of player profiles or data 416 matching the selected filter 422. That is, the selected filter 422 can include a selection of a "players" filter, which can cause the GUI 420 to display a subset of the list of player profiles or data 416 matching with the filters (e.g., including player profiles and filtering out team-specific information or notes). In some implementations, the GUI 430 can include a selected filter 432 and a team entry 434. That is, the selected filter 422 can include a selection of a "teams" filter option, which can cause GUI 430 to display a subset of the list of player profiles or data including a team entry 434 corresponding with the selected filter. In another example, the selected filter 422 can include a selection of a "notes" filter (e.g., causing the GUI 430 to display a list of note entries) or a "starred" filter (e.g., causing the GUI 430 to display a list of favorited profiles and/or entries). In some implementations, the digital application can display an indicator (e.g., numbered text bubble) representing a selected filter and/or indicating that one or more filters are selected (e.g., "filtered by school and two other criteria").

Referring now to FIG. 4B, the one or more user interfaces 400b shown can include graphical user interface (GUI) 440, GUI 450, and/or GUI 460, which can be presented and/or displayed via a digital application (e.g., digital application 112) executed by one or more user devices (e.g., user devices 110). For example, the GUI 440 can include a filtering interface 442 with one or more configurable or selectable filter options. That is, the GUI 440 can receive a selection of one or more filters and apply the selected filters to identify and/or output a list of profiles and/or data entries corresponding with the filters. In some implementations, the GUI 440 can include a filter application element (e.g., "apply" button) configured to cause the GUI 440, responsive to an interaction with the filter application element, to generate a list of results or data based on selected options from the filtering interface 442. For example, the GUI 440 can provide filtering options to refine results based on a corresponding organization (e.g., school, conference, team, league), position (e.g., role), and/or other attributes associated with a player or team. In some implementations, the GUI 440 can receive free-form textual inputs corresponding with filters (e.g., using a keyboard or microphone) and/or present predefined options (e.g. list of school names) via a dropdown menu included on the GUI 440 to receive filter selections.

In some implementations, in response to applying one or more filter selections or options, the GUI 450 can display a search or filter results interface including one or more player profiles, team profiles, and/or other data entries corresponding with the filter selections or options. For example, the GUI 450 can include a focus view 452 (e.g., a shortlist of players, teams, etc.) including at least one profile or entry corresponding with the selected filter options. In some implementations, the roster view 454 can include one or more profiles or entries associated with the profile or entry included in the focus view 452 (e.g., teammate profiles of a player profile matching the selected filter options). In some implementations, the GUI 450 can include navigation elements or links, such as a roster element 456, a recording element 458, and/or a notes element 459. For example, the roster element 456 can provide access to a full team roster associated with the selected profile, the recording element 458 can activate an audio recording interface for capturing scouting notes or observations, and/or the notes element 459 can present an interface for editing scouting notes linked to the selected profile. Additionally, the GUI 450 can dynamically update one or more of focus view 452 and/or roster view 454 based on user interactions with one or more of the roster element 456, recording element 458, and/or notes element 459.

In some implementations, the GUI 460 can include a league selection element 462 and one or more league options 464. That is, the league selection element 462 can include an interactive button or other user interface element used to determine an operational setting or configuration of the digital application executing the GUI 460 (e.g., an NFL mode, NCAA mode). For example, a user can select one or more league options using the league selection element 462 to cause the GUI 460 to display league-specific information (e.g., player profiles or other entries associated with teams, players, and/or scouts in a league) and/or perform league-specific actions (e.g., using league-specific templates for report generation, generating outputs based on computing platforms or database schemas associated with a league). That is, the GUI 460 can update a display of one or more player profiles and/or data entries in response to receiving a selection of a league based on one or more league options 464 presented via the league selection element 462 and can dynamically update the display based on additional and/or subsequent selections (e.g., selection of a different league).

Referring now to FIG. 4C, the user interface 400c can include graphical user interface (GUI) 470, which can be presented and/or displayed via a digital application (e.g., digital application 112) executed by one or more user devices (e.g., user devices 110). For example, the GUI 470 can include a filtering interface with various filtering options that can be included and/or presented to a user of the scouting application (e.g., via an output device or touch-screen display). For example, the GUI 470 can include options to sort or organize data (e.g., player profiles, data entries, notes, scouting reports, performance metrics, and/or any evaluation criteria) by one or more general categories (e.g., players, teams, notes, starred, positions, events, and/or any grouping criteria), one or more team-specific categories (e.g., with filtering options or checkboxes for team names), scout-specific information (e.g., scout and/or coach names), league-specific information, position or role information, grades (e.g., scout and/or coach assigned metrics or observations), and/or additional options (e.g., statistics, future projections, historical data trends, role adaptability metrics, and/or any derived insights). For example, selecting a filtering option for a team name (e.g., via a list or dropdown) can cause the GUI 470 to display a roster view or summary data corresponding with one or more players of the team and/or team-specific data entries.

In some implementations, in response to a selection via a digital application of a filtering option corresponding to a name of a scout, the GUI 470 can dynamically adjust the displayed list to include profiles corresponding with the scout and/or coach (e.g., players evaluated by the scout) and/or entries associated with the selected scout and/or coach (e.g., scout and/or coach notes). In some implementations, the digital application can include functionality to remember (e.g., store in memory) previously selected leagues, teams, and/or conferences for subsequent access. For example, when a scout and/or coach reopens the application, the digital application can automatically present the league, team, and/or conference data most recently accessed by the scout.

In some implementations, the digital application (e.g., via one or more interfaces or GUIs) can support streamlined player evaluations by creating, managing, and/or displaying focused lists or results. For example, the digital application can assign or "star" specific players from a list of profiles to create a focused section that prioritizes a focused or streamlined list of players for evaluation. In some implementations, the digital application can dynamically update the focus view based on one or more selections and display the view using one or more GUIs (e.g., a roster view or a separate focus list interface). In some implementations, the digital application can provide a hierarchy of leagues, conferences, teams, and/or other options that can be used to locate or identify player profiles. In some implementations, a scout and/or coach can access a player profile and select a starring option to include the player in the focused section of the roster. In some implementations, the focused section can display starred players associated with a school or team such that players relevant to the current evaluation context are shown. If the scout and/or coach navigates to a different school or team, the digital application can dynamically adjust the focused list to display the starred players for that particular school or team. Additionally, the digital application can support working lists for ongoing evaluations. For example, the application can include a working list option in the navigation bar or filtering interface, allowing scouts to view and manage player reports have been started but are incomplete. The working list can include players across various schools or teams and can organize entries based on a corresponding evaluation status (e.g., in progress, sections incomplete).

In some implementations, the digital application (e.g., via one or more interfaces or GUIs) can provide search functionalities to access and manage scouting data across various categories or data types, such as players or teams (e.g., profiles), notes, and/or other data entries. For example, the digital application can include a universal search interface that identifies and returns results of various types matching a user query. In some implementations, the search interface can dynamically display relevant categories (e.g., players, teams, notes) such that scouts can refine results by selecting one or more options (e.g., filters) corresponding with a data type or category presented. In some implementations, the digital application or GUIs can display starred profiles or entries prominently in search results (e.g., near the top or in a dedicated section) to provide access to prioritized profiles and/or reports in progress.

Referring now to FIG. 5, a depiction of a computer system 500 is shown. The computer system 500 that can be used, for example, to implement the example system 100 of FIG. 1, user device 110, network 120, data processing system 130, included sub-systems of the data processing system 130 (e.g., digital content system 132, modeling system 134, AI model(s) 136, providing system 138), database 140, scouting computing system(s) 150, data source(s) 160, and/or various other example systems described in the present disclosure. The computing system 500 includes a bus 505 or other communication component for communicating information and a processor 510 coupled to the bus 505 for processing information. The computing system 500 also includes main memory 515, such as a random-access memory (RAM) or other dynamic storage device, coupled to the bus 505 for storing information, and/or instructions to be executed by the processor 510. Main memory 515 can also be used for storing position information, temporary variables, and/or other intermediate information during execution of instructions by the processor 510. The computing system 500 can further include a read only memory (ROM) 520 or other static storage device coupled to the bus 505 for storing static information and instructions for the processor 510. A storage device 525, such as a solid-state device, magnetic disk or optical disk, is coupled to the bus 505 for persistently storing information and instructions.

The computing system 500 can be coupled via the bus 505 to a display 535, such as a liquid crystal display, and/or active matrix display, for displaying information to a user. An input device 530, such as a keyboard including alphanumeric and other keys, can be coupled to the bus 505 for communicating information, and/or command selections to the processor 510. In another implementation, the input device 530 has a touch screen display 535. The input device 530 can include any type of biometric sensor, a cursor control, such as a mouse, a trackball, and/or cursor direction keys, for communicating direction information and command selections to the processor 510 and for controlling cursor movement on the display 535.

In some implementations, the computing system 500 can include a communications adapter 540, such as a networking adapter. Communications adapter 540 can be coupled to bus 505 and can be configured to provide communications with a computing or communications network 120 and/or other computing systems. In various illustrative implementations, any type of networking configuration can be achieved using communications adapter 540, such as wired (e.g., via Ethernet), wireless (e.g., via Wi-Fi, Bluetooth), satellite (e.g., via GPS) pre-configured, ad-hoc, LAN, WAN.

According to various implementations, the processes that effectuate illustrative implementations that are described herein can be achieved by the computing system 500 in response to the processor 510 executing an arrangement of instructions contained in main memory 515. Such instructions can be read into main memory 515 from another non-transitory computer-readable medium (CRM), such as the storage device 525. Execution of the arrangement of instructions contained in main memory 515 causes the computing system 500 to perform the illustrative processes described herein. One or more processors in a multi-processing arrangement can also be employed to execute the instructions contained in main memory 515. In alternative implementations, hard-wired circuitry can be used in place of or in combination with software instructions to implement illustrative implementations. Thus, implementations are not limited to any specific combination of hardware circuitry and software.

That is, although an example processing system has been described in FIG. 5, implementations of the subject matter and the functional operations described in this specification can be carried out using other types of digital electronic circuitry, and/or in computer software (e.g., application, blockchain, distributed ledger technology) embodied on a tangible medium, firmware, and/or hardware, including the structures disclosed in this specification and their structural equivalents, and/or in combinations of one or more of them. implementations of the subject matter described in this specification can be implemented as one or more computer programs, e.g., one or more subsystems of computer program instructions, encoded on one or more computer storage medium for execution by, and/or to control the operation of, data processing apparatus. Alternatively, and/or in addition, the program instructions can be encoded on an artificially generated propagated signal, e.g., a machine generated electrical, optical, and/or electromagnetic signal, that is generated to encode information for transmission to suitable receiver apparatus for execution by a data processing apparatus. A computer storage medium can be, and/or be included in, a computer-readable storage device, a computer-readable storage substrate, a random or serial access memory array or device, and/or a combination of one or more of them. Moreover, while a computer storage medium is not a propagated signal, a computer storage medium can be a source or destination of computer program instructions encoded in an artificially generated propagated signal. The computer storage medium can also be, and/or be included in, one or more separate components or media (e.g., multiple CDs, disks, and/or other storage devices). Accordingly, the computer storage medium is both tangible and non-transitory.

Although shown in the implementations of FIG. 5 as singular, stand-alone devices, one of ordinary skill in the art will appreciate that, in some implementations, the computing system 500 can include virtualized systems and/or system resources. For example, in some implementations, the computing system 500 can be a virtual switch, virtual router, virtual host, virtual server. In various implementations, computing system 500 can share physical storage, hardware, and/or other resources with other virtual machines. In some implementations, virtual resources of the network can include cloud computing resources such that a virtual resource can rely on distributed processing across more than one physical processor, distributed memory, etc.

While this specification contains many specific implementation details and/or arrangement details, these should not be construed as limitations on the scope of any disclosure or of what can be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features can be described above as acting in certain combinations and even initially claimed as such, one or more features from a claimed combination can in some cases be excised from the combination, and/or the claimed combination can be directed to a subcombination or variation of a subcombination.

Additionally, features described with respect to particular headings can be utilized with respect to and/or in combination with illustrative implementation described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, and/or that all illustrated operations be performed, to achieve desirable results. In some cases, the actions recited in the claims can be performed in a different order and still achieve desirable results. In addition, the processes depicted in the accompanying figures do not necessarily require the particular order shown, and/or sequential order, to achieve desirable results.

In certain circumstances, multitasking and parallel processing can be advantageous. Moreover, the separation of various system components in the implementations and/or arrangements described above should not be understood as requiring such separation in all implementations and/or arrangements, and/or it should be understood that the described program components and systems can generally be integrated together in a single software product or packaged into multiple software products.

Having now described some illustrative implementations, implementations, illustrative arrangements, and/or arrangements it is apparent that the foregoing is illustrative and not limiting, having been presented by way of example. In particular, although many of the examples presented herein involve specific combinations of method acts or system elements, those acts, and/or those elements can be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and/or additional items, as well as alternate implementations and/or arrangements consisting of the items listed thereafter exclusively. In one arrangement, the systems and methods described herein consist of one, at least one (e.g., each) combination of more than one, and/or all of the described elements, acts, and/or components.

Any references to implementations, arrangements, and/or elements or acts of the systems and methods herein referred to in the singular can also embrace implementations and/or arrangements including a plurality of these elements, and/or any references in plural to any implementation, arrangement, and/or element or act herein can also embrace implementations and/or arrangements including only a single element. References in the singular or plural form are not intended to limit the presently disclosed systems or methods, their components, acts, and/or elements to single or plural configurations. References to any act or element being based on any information, act or element can include implementations and/or arrangements where the act or element is based at least in part on any information, act, and/or element.

Any implementation disclosed herein can be combined with any other implementation, and/or references to "an implementation," "some implementations," "an alternate implementation," "various implementation," "one implementation" or the like are not necessarily mutually exclusive and are intended to indicate that a particular feature, structure, and/or characteristic described in connection with the implementation can be included in at least one implementation. Such terms as used herein are not necessarily all referring to the same implementation. Any implementation can be combined with any other implementation, inclusively or exclusively, in any manner consistent with the aspects and implementations disclosed herein.

Any arrangement disclosed herein can be combined with any other arrangement, and/or references to "an arrangement," "some arrangements," "an alternate arrangement," "various arrangements," "one arrangement" or the like are not necessarily mutually exclusive and are intended to indicate that a particular feature, structure, and/or characteristic described in connection with the arrangement can be included in at least one arrangement. Such terms as used herein are not necessarily all referring to the same arrangement. Any arrangement can be combined with any other arrangement, inclusively or exclusively, in any manner consistent with the aspects and arrangements disclosed herein.

References to "or" can be construed as inclusive so that any terms described using "or" can indicate any of a single, more than one, and/or all of the described terms.

Where technical features in the drawings, detailed description or any claim are followed by reference signs, the reference signs have been included for the sole purpose of increasing the intelligibility of the drawings, detailed description, and/or claims. Accordingly, neither the reference signs nor their absence have any limiting effect on the scope of any claim elements.

The systems and methods described herein can be embodied in other specific forms without departing from the characteristics thereof. The foregoing implementations and/or arrangements are illustrative rather than limiting of the described systems and methods. Scope of the systems and methods described herein is thus indicated by the appended claims, rather than the foregoing description, and/or changes that come within the meaning and range of equivalency of the claims are embraced therein.

It should be understood that no claim element herein is to be construed under the provisions of 35 U.S.C. § 112 (f) unless the element is expressly recited using the phrase "means for."

It should be understood that the phrase "in response to" or "responsive to," as used herein, can include various causal and contextual relationships between an initiating event, action, and/or condition and a subsequent action or operation. That is, the phrases "in response to" or "responsive to" can include actions or operations performed directly as a result of the initiating event/action or condition, indirectly in relation to the initiating event/action or condition, based on data or parameters derived from or otherwise related to the initiating event/action or condition, and/or as a portion of a sequence or process of which the initiating event serves as one of multiple inputs, factors, and/or considerations causing the subsequent action or operation.

As used herein, the term "circuit" can include hardware structured to execute the functions described herein. In some implementations, at least one (e.g., each) respective "circuit" can include machine-readable media for configuring the hardware to execute the functions described herein. The circuit can be embodied as one or more circuitry components including, but not limited to, processing circuitry, network interfaces, peripheral devices, input devices, output devices, sensors. In some implementations, a circuit can take the form of one or more analog circuits, electronic circuits (e.g., integrated circuits (IC), discrete circuits, system on a chip (SOC) circuits), telecommunication circuits, hybrid circuits, and/or any other type of "circuit." In this regard, the "circuit" can include any type of component for accomplishing or facilitating achievement of the operations described herein. For example, a circuit as described herein can include one or more transistors, logic gates (e.g., NAND, AND, NOR, OR, XOR, NOT, XNOR), resistors, multiplexers, registers, capacitors, inductors, diodes, wiring.

The "circuit" can also include one or more processors communicatively coupled to one or more memory or memory devices. In this regard, the one or more processors can execute instructions stored in the memory or can execute instructions otherwise accessible to the one or more processors. In some implementations, the one or more processors can be embodied in various ways. The one or more processors can be constructed in a manner sufficient to perform at least the operations described herein. In some implementations, the one or more processors can be shared by multiple circuits (e.g., circuit A and circuit B can comprise or otherwise share the same processor which, in some example implementations, can execute instructions stored, and/or otherwise accessed, via different areas of memory). Alternatively, and/or additionally, the one or more processors can be structured to perform or otherwise execute certain operations independent of one or more co-processors. In other example implementations, two or more processors can be coupled via a bus to facilitate independent, parallel, pipelined, and/or multi-threaded instruction execution. At least one (e.g., each) processor can be implemented as one or more general-purpose processors, application specific integrated circuits (ASICs), field programmable gate arrays (FPGAs), digital signal processors (DSPs), and/or other suitable electronic data processing components structured to execute instructions provided by memory. The one or more processors can take the form of a single core processor, multi-core processor (e.g., a dual core processor, triple core processor, quad core processor), microprocessor. In some implementations, the one or more processors can be external to the apparatus, for example the one or more processors can be a remote processor (e.g., a cloud based processor). Alternatively, and/or additionally, the one or more processors can be internal and/or local to the apparatus. In this regard, a given circuit or components thereof can be disposed locally (e.g., as part of a local server, a local computing system) or remotely (e.g., as part of a remote server such as a cloud based server). To that end, a "circuit" as described herein can include components that are distributed across one or more locations.

An exemplary system for implementing the overall system or portions of the implementations can include a general purpose computing devices in the form of computers, including a processing unit, a system memory, and/or a system bus that couples various system components including the system memory to the processing unit. At least one (e.g., each) memory device can include non-transient volatile storage media, non-volatile storage media, non-transitory storage media (e.g., one or more volatile and/or non-volatile memories), etc. In some implementations, the non-volatile media can take the form of ROM, flash memory (e.g., flash memory such as NAND, 3D NAND, NOR, 3D NOR), EEPROM, MRAM, magnetic storage, hard discs, optical discs, etc. In other implementations, the volatile storage media can take the form of RAM, TRAM, ZRAM, etc. Combinations of the above are also included within the scope of machine-readable media. In this regard, machine-executable instructions include, for example, instructions and data which cause a general purpose computer, special purpose computer, and/or special purpose processing machines to perform a certain function or group of functions. At least one (e.g., each) respective memory device can be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, can include any type of input device including, but not limited to, a keyboard, a keypad, a mouse, joystick or other input devices performing a similar function. Comparatively, the term "output device," as described herein, can include any type of output device including, but not limited to, a computer monitor, printer, facsimile machine, and/or other output devices performing a similar function.

It should be noted that although the diagrams herein can show a specific order and composition of method steps, it is understood that the order of these steps can differ from what is depicted. For example, two or more steps can be performed concurrently or with partial concurrence. Also, some method steps that are performed as discrete steps can be combined, steps being performed as a combined step can be separated into discrete steps, the sequence of certain processes can be reversed or otherwise varied, and/or the nature or number of discrete processes can be altered or varied. The order or sequence of any element or apparatus can be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure can be accomplished with standard programming techniques with rule-based logic and other logic to accomplish the various database searching steps, correlation steps, comparison steps and decision steps.

What is claimed is:

1. A system, comprising:
 one or more processors to execute operations comprising:
  receive, via an interface, digital content comprising at least one captured media segment corresponding with at least one player;
  apply the digital content and a sport-specific dataset as input to at least one artificial intelligence (AI) model to cause the at least one AI model to generate a player profile comprising a sport-specific textual representation of the at least one player corresponding to a plurality of performance parameters, the at least one AI model configured based at least on sport vernacular and historical labeled digital content of a sport of the at least one player, wherein generating the player profile comprises:
   modeling, using the at least one AI model, the digital content and the sport-specific dataset to generate the plurality of performance parameters comprising at least one metric or at least one indicator corresponding to a predicted future performance of the at least one player;
   generate a structured data package comprising the player profile based at least on organizing, using at least one sport-specific template, at least a portion of the sport-specific textual representation, wherein generating the structured data package comprises integrating, from one or more data sources, third-party data into the structured data package corresponding with the player profile; and provide the structured data package to a digital application or a scouting computing system.

2. The system of claim 1, wherein generating the player profile comprises:

simulating, using the at least one AI model, the at least one player based at least on the digital content to generate at least one capability corresponding to a position parameter or performance attribute;

wherein physical performance data is further applied as input to the at least one AI model to generate the player profile, wherein the physical performance data comprises at least one (i) sensor metric corresponding with position tracking or biometric output or (ii) game metric corresponding with an in-game performance.

3. The system of claim 1, wherein generating the player profile comprises at least one of:

modeling, using the digital content and a sport-specific role dataset, at plurality of role scenarios of the at least one player to generate the plurality of performance parameters comprising a plurality of role-based performance metrics corresponding to at least one update in the player profile based on a plurality of roles according to the sport-specific role dataset;

modeling, using the digital content and at least one roster dataset, chemistry of the at least one player with at least one roster of the at least one roster dataset to generate at least one of the plurality of performance parameters comprising a chemistry indicator corresponding to simulated interactions with the at least one roster; or modeling a plurality of event scenarios corresponding to environmental conditions or event conditions to generate at least one of the plurality of performance parameters comprising a performance metric of the at least one player under each of the plurality of event scenarios.

4. The system of claim 1, wherein generating the player profile comprises at least one of:

modeling, in real-time, the digital content corresponding to a real-time analysis captured in the at least one captured media segment to generate the sport-specific textual representation;

modeling, using the digital content and an event log dataset, a player interaction corresponding to recorded event tracking actions between the at least one player and one or more other players to generate the plurality of performance parameters comprising a plurality of interaction metrics corresponding to interaction effectiveness; or modeling, using the digital content and a sport-specific role dataset, an in-game interaction corresponding to positional updates of the at least one player to generate at least one of the plurality of performance parameters comprising a role adaptation metric.

5. A system, comprising:

one or more processors to execute operations comprising:

receive, via an interface, digital content comprising at least one captured media segment corresponding with at least one player;

apply the digital content as input to at least one artificial intelligence (AI) model to cause the at least one AI model to generate a player profile comprising a sport-specific textual representation of the at least one player corresponding to a plurality of performance parameters, the at least one AI model configured based at least on sport vernacular and historical labeled digital content of a sport of the at least one player;

generate a structured data package comprising the player profile based at least on organizing, using at least one sport-specific template, at least a portion of the sport-specific textual representation, wherein generating the structured data package comprises integrating, from one or more data sources, third-party data into the structured data package corresponding with the player profile; and provide the structured data package to a digital application or a scouting computing system.

6. The system of claim 5, wherein generating the player profile comprises:

simulating, using the at least one AI model, the at least one player based at least on the digital content to generate at least one capability corresponding to a position parameter or performance attribute;

wherein physical performance data is further applied as input to the at least one AI model to generate the player profile, wherein the physical performance data comprises at least one (i) sensor metric corresponding with position tracking or biometric output or (ii) game metric corresponding with an in-game performance.

7. The system of claim 5, wherein generating the player profile comprises at least one of:

modeling, using the digital content and a sport-specific role dataset, at plurality of role scenarios of the at least one player to generate the plurality of performance parameters comprising a plurality of role-based performance metrics corresponding to at least one update in the player profile based on a plurality of roles according to the sport-specific role dataset;

modeling, using the digital content and at least one roster dataset, chemistry of the at least one player with at least one roster of the at least one roster dataset to generate at least one of the plurality of performance parameters comprising a chemistry indicator corresponding to simulated interactions with the at least one roster; or modeling a plurality of event scenarios corresponding to environmental conditions or event conditions to generate at least one of the plurality of performance parameters comprising a performance metric of the at least one player under each of the plurality of event scenarios.

8. The system of claim 5, wherein generating the player profile comprises at least one of:

modeling, in real-time, the digital content corresponding to a real-time analysis captured in the at least one captured media segment to generate the sport-specific textual representation;

modeling, using the digital content and an event log dataset, a player interaction corresponding to recorded event tracking actions between the at least one player and one or more other players to generate the plurality of performance parameters comprising a plurality of interaction metrics corresponding to interaction effectiveness; or modeling, using the digital content and a sport-specific role dataset, an in-game interaction corresponding to positional updates of the at least one player to generate at least one of the plurality of performance parameters comprising a role adaptation metric.

9. The system of claim 5, wherein the one or more processors are to execute operations comprising:
activate a live scouting mode in the digital application, wherein activating the live scouting mode comprises continuously capturing the digital content and applying the digital content as input to the at least one AI model to generate or update the sport-specific textual representation in real-time.

10. The system of claim 5, wherein the one or more processors are to execute operations comprising:
generate at least one trip schedule based on determining a travel path, event timing conflicts, and scout availability of a scout.

11. The system of claim 5, wherein the one or more processors are to execute operations comprising:
generate or update the digital content based on extracting at least one unstructured player metric of the at least one player from the at least one captured media segment.

12. The system of claim 5, wherein generating the player profile comprises:
correlating at least one quantitative player performance metric from processed digital content with descriptive data from at least one observation in the processed digital content to generate at least one alignment metric;
determining at least one evaluation score representing a weighted combination of the at least one quantitative player performance metric and at least one scout-assigned grade of the at least one player; and
generating at least one predictive metric for a future player performance based on historical game data and the digital content corresponding with an identified trend in the at least one captured media segment.

13. The system of claim 5, wherein the one or more processors are to execute operations comprising:
normalize a plurality of player grades of a plurality of player profiles by applying a calibration function aligning the plurality of player grades of a plurality of scouts and a plurality of players.

14. The system of claim 5, wherein the one or more processors are to execute operations comprising:
in response to receiving the digital content, identify environmental data corresponding with the at least one captured media segment;
wherein the environmental data is further applied as input to the at least one AI model to cause the at least one AI model to generate the player profile.

15. The system of claim 5, wherein the one or more processors are to execute operations comprising:
transmit, to the digital application, at least one partially captured media segment;
update the digital application with the structured data package responsive to generating the structured data package;
provide, in the digital application, a text editing interface to update a portion of the structured data package; and
responsive to receiving an interaction with the text editing interface, update the portion of the structured data package and update the player profile.

16. The system of claim 5, wherein the one or more processors are to execute operations comprising:
continue capturing the at least one captured media segment responsive to a navigation closing the digital application or a display of a user device deactivating.

17. The system of claim 5, wherein the sport-specific textual representation comprises a plurality of player-specific performance metrics and corresponding environmental or interaction data, wherein the plurality of performance parameters comprise one or more metrics or indicators corresponding with capabilities, tendencies, or achievements of the at least one player, and wherein training the at least one AI model comprises updating one or more modeling parameters used by the at least one AI model in generating one or more subsequent outputs based on the sport vernacular and historical labeled digital content.

18. The system of claim 5, wherein the at least one sport-specific template corresponds to a predefined schema identifying at least one configuration or state of the digital application, and wherein the organizing the portion of the sport-specific textual representation comprises mapping the portion to one or more fields of the structured data package based on the predefined schema.

19. The system of claim 5, wherein the one or more processors are to execute operations comprising:
simulate at least one player interaction of the at least one player to generate a predictive metric or a performance evaluation.

20. The system of claim 19, wherein the one or more processors are to execute operations comprising:
update the player profile based on the predictive metric or the performance evaluation.

21. A method, comprising:
receiving, by one or more processors via an interface, digital content comprising at least one captured media segment corresponding with at least one player;
applying, by the one or more or more processors, the digital content as input to at least one artificial intelligence (AI) model to cause the at least one AI model to generate a player profile comprising a sport-specific textual representation of the at least one player corresponding to a plurality of performance parameters, the at least one AI model configured based at least on sport vernacular and historical labeled digital content of a sport of the at least one player;
generating, by the one or more processors, a structured data package comprising the player profile based at least on organizing, using at least one sport-specific template, at least a portion of the sport-specific textual representation, wherein generating the structured data package comprises integrating, from one or more data sources, third-party data into the structured data package corresponding with the player profile; and
providing, by the one or more processors, the structured data package to a digital application or a scouting computing system.

22. A system, comprising:
one or more processors to execute operations comprising:
receive, via an interface, digital content comprising at least one captured media segment corresponding with at least one player;
generate or update the digital content based on extracting at least one unstructured player metric of the at least one player from the at least one captured media segment;
apply the digital content as input to at least one artificial intelligence (AI) model to cause the at least one AI model to generate a player profile comprising a sport-specific textual representation of the at least one player corresponding to a plurality of performance parameters, the at least one AI model configured based at least on sport vernacular and historical labeled digital content of a sport of the at least one player;

generate a structured data package comprising the player profile based at least on organizing, using at least one sport-specific template, at least a portion of the sport-specific textual representation; and provide the structured data package to a digital application or a scouting computing system.

23. The system of claim 22, wherein generating the player profile comprises:

simulating the at least one player based at least on the digital content to generate at least one capability corresponding to a position parameter or performance attribute.

24. The system of claim 22, wherein generating the player profile comprises:

generating, using the at least one AI model and based at least on the digital content, a digital twin representation of the at least one player, the digital twin representation configured to replicate at least one capability corresponding to a position parameter or performance attribute;

iteratively simulating an in-game scenario comprising a predefined play structure or formation using the digital twin representation of the at least one player; and generating, based on the iterative simulation of the in-game scenario, a predictive metric indicating an expected performance of the at least one player in the predefined play structure or formation.

25. A method, comprising:

receiving, by one or more processors via an interface, digital content comprising at least one captured media segment corresponding with at least one player;

generating or updating, by the one or more processors, the digital content based on extracting at least one unstructured player metric of the at least one player from the at least one captured media segment;

applying, by the one or more or more processors, the digital content as input to at least one artificial intelligence (AI) model to cause the at least one AI model to generate a player profile comprising a sport-specific textual representation of the at least one player corresponding to a plurality of performance parameters, the at least one AI model configured based at least on sport vernacular and historical labeled digital content of a sport of the at least one player;

generating, by the one or more processors, a structured data package comprising the player profile based at least on organizing, using at least one sport-specific template, at least a portion of the sport-specific textual representation; and providing, by the one or more processors, the structured data package to a digital application or a scouting computing system.

26. The method of claim 25, wherein generating the player profile comprises:

simulating the at least one player based at least on the digital content to generate at least one capability corresponding to a position parameter or performance attribute.

27. The method of claim 25, wherein generating the player profile comprises:

generating, using the at least one AI model and based at least on the digital content, a digital twin representation of the at least one player, the digital twin representation configured to replicate at least one capability corresponding to a position parameter or performance attribute;

iteratively simulating an in-game scenario comprising a predefined play structure or formation using the digital twin representation of the at least one player; and generating, based on the iterative simulation of the in-game scenario, a predictive metric indicating an expected performance of the at least one player in the predefined play structure or formation.

28. A system, comprising:

one or more processors to execute operations comprising:

receive, via an interface, digital content comprising at least one captured media segment corresponding with at least one player;

in response to receiving the digital content, identify environmental data corresponding with the at least one captured media segment;

apply the digital content as input to at least one artificial intelligence (AI) model to cause the at least one AI model to generate a player profile comprising a sport-specific textual representation of the at least one player corresponding to a plurality of performance parameters, the at least one AI model configured based at least on sport vernacular and historical labeled digital content of a sport of the at least one player, wherein the environmental data is further applied as input to the at least one AI model to cause the at least one AI model to generate the player profile;

generate a structured data package comprising the player profile based at least on organizing, using at least one sport-specific template, at least a portion of the sport-specific textual representation; and provide the structured data package to a digital application or a scouting computing system.

29. A system, comprising:

one or more processors to execute operations comprising:

activate a live scouting mode in a digital application, wherein activating the live scouting mode comprises capturing digital content;

receive, via an interface of the digital application, the digital content comprising at least one captured media segment corresponding with at least one player;

apply the digital content as input to at least one artificial intelligence (AI) model to cause the at least one AI model to generate a player profile comprising a sport-specific textual representation of the at least one player corresponding to a plurality of performance parameters, the at least one AI model configured based at least on sport vernacular and historical labeled digital content of a sport of the at least one player;

generate a structured data package comprising the player profile based at least on organizing, using at least one sport-specific template, at least a portion of the sport-specific textual representation, wherein generating the structured data package comprises integrating third-party data into the structured data package corresponding with the player profile; and provide the structured data package to the digital application or a scouting computing system.

* * * * *